US007792927B2

(12) United States Patent
Umehara et al.

(10) Patent No.: US 7,792,927 B2
(45) Date of Patent: Sep. 7, 2010

(54) OUTPUT REQUESTING APPARATUS VIA A NETWORK FOR USER-POSITION AND APPARATUS-POSITION INFORMATION

(75) Inventors: Naoki Umehara, Chiba (JP); Takahiro Asai, Kanagawa (JP); Takuya Imai, Tokyo (JP); Yukiko Sahashi, Tokyo (JP); Mototsugu Emori, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 258 days.

(21) Appl. No.: 11/708,096

(22) Filed: Feb. 16, 2007

(65) Prior Publication Data

US 2007/0195364 A1     Aug. 23, 2007

(30) Foreign Application Priority Data

| Feb. 20, 2006 | (JP) | ............................ 2006/043197 |
| Feb. 20, 2006 | (JP) | ............................ 2006-043198 |
| Jan. 12, 2007 | (JP) | ............................ 2007-004921 |
| Jan. 22, 2007 | (JP) | ............................ 2007-012022 |

(51) Int. Cl.
*G06F 15/16* (2006.01)
*G06F 3/033* (2006.01)
*G06G 5/08* (2006.01)

(52) U.S. Cl. ...................... 709/219; 345/157
(58) Field of Classification Search ................. 709/204, 709/220–226; 358/1.15; 705/6, 1, 28, 26, 705/27, 56, 35, 37, 44, 10; 717/121, 126, 717/177, 101; 707/100, 10
See application file for complete search history.

(56) References Cited

U.S. PATENT DOCUMENTS

| 5,353,399 | A  | * | 10/1994 | Kuwamoto et al. | ......... 715/736 |
| 5,461,710 | A  | * | 10/1995 | Bloomfield et al. | ......... 715/839 |
| 7,327,259 | B2 | * | 2/2008 | Kim et al. | ................ 340/572.1 |
| 7,408,657 | B2 | * | 8/2008 | Suzuki et al. | ............... 358/1.13 |
| 2003/0027528 | A1 | * | 2/2003 | Hagiwara et al. | ............. 455/66 |
| 2004/0054962 | A1 | * | 3/2004 | Shima et al. | ................ 715/500 |
| 2004/0125145 | A1 | * | 7/2004 | Sano et al. | .................. 345/771 |
| 2004/0179230 | A1 | * | 9/2004 | Kitada et al. | ............... 358/1.15 |
| 2004/0190049 | A1 | * | 9/2004 | Itoh | ......................... 358/1.15 |

FOREIGN PATENT DOCUMENTS

JP     2001-337765     12/2001

* cited by examiner

*Primary Examiner*—Nathan Flynn
*Assistant Examiner*—Mark O Afolabi
(74) *Attorney, Agent, or Firm*—Cooper & Dunham LLP

(57) ABSTRACT

An output requesting apparatus is connected via a network to an output apparatus and a position-management server. In the output requesting apparatus, a receiving unit receives, from the position-management server, user-position information, apparatus-position information, and a map image. Based on the user-position information and the apparatus-position information, a display control unit arranges a user symbol, an apparatus symbol, and a data symbol in the map image to display the map image. An input unit receives input to select the user symbol, the apparatus symbol, and the data symbol. A transmitting unit transmits, to the output apparatus corresponding to the apparatus symbol, a command to output data corresponding to the data symbol, and information including identification information of a user corresponding to the user symbol.

6 Claims, 21 Drawing Sheets

FIG. 3

| TAG ID | SENSOR ID | DETECTION TIME |
|---|---|---|
| tag 1 | sns 1 | 2004/1/10 15:00:30 |
| tag 2 | sns 2 | 2004/1/10 15:00:28 |
| tag 3 | sns 3 | 2004/1/10 15:00:29 |

FIG. 4

| TAG ID | FLOOR | POSITION INFORMATION | DETECTION TIME |
|---|---|---|---|
| tag 1 | 1F | (12, 14) | 2004/1/10 15:00:30 |
| tag 2 | 2F | (13, 15) | 2004/1/10 15:00:30 |
| tag 3 | 3F | (12, 14) | 2004/1/10 15:00:31 |

FIG. 5A

| PRINTER ID | FLOOR | LOCATION NAME | POSITION INFORMATION (COORDINATES) | ADDRESS (IP ADDRESS, SIP ADDRESS, ETC.) | MODEL | FILE NAME OF ICON | PRINTER ABILITY ID |
|---|---|---|---|---|---|---|---|
| p 1 | 1F | MEETING ROOM 1 | (90, 80) | xxx.yyy.yyy.zzz | 40 | p-icon1.gif | CPBLTY 1 |
| p 2 | 1F | MEETING ROOM 2 | (110, 80) | nnn.mmm.ooo.nnn | 40a | p-icon2.gif | CPBLTY 2 |
| p 3 | 3F | MEETING ROOM 3 | (110, 50) | pri3@abc.co.jp | 40b | p-icon3.gif | CPBLTY 3 |

FIG. 5B

| PRINTER ABILITY ID | PRINT SIZE | COLOR/ MONOCHROME | PAGE LAYOUT | DUPLEX PRINTING | FINISHER |
|---|---|---|---|---|---|
| CPBLTY 1 | A4 B5 | MONOCHROME | ONE PAGE/SHEET | BOTH SIDES (BOUND ON LONG SIDE) | — |
| CPBLTY 2 | A4 A3 B4 B5 | COLOR MONOCHROME | ONE PAGE/SHEET TWO PAGES/SHEET FOUR PAGES/SHEET | BOTH SIDES (BOUND ON LONG SIDE) BOTH SIDES (BOUND ON SHORT SIDE) | STAPLE PUNCH |
| CPBLTY 3 | A4 A3 B4 | COLOR MONOCHROME | ONE PAGE/SHEET TWO PAGES/SHEET | BOTH SIDES (BOUND ON LONG SIDE) | STAPLE |

FIG. 6

| MAP ID | FLOOR | X COORDINATE | Y COORDINATE | FILE NAME OF MAP IMAGE |
|---|---|---|---|---|
| Map 1 | 1F | 0-200 | 0-120 | 1F.jpg |
| Map 2 | 2F | 0-100 | 0-120 | 2F.jpg |
| Map 3 | 3F | 0-200 | 0-120 | 3F.jpg |

FIG. 7

| TAG ID | DESTINATION | TELEPHONE NUMBER | USER NAME | USER ICON NAME | USER PC ADDRESS | IC CARD ID |
|---|---|---|---|---|---|---|
| tag 1 | hum1@xxx.co.jp | 03-xxxx-0001 | OOICHIRO | User1.gif | 111.111.111.111 | ICID 1 |
| tag 2 | hum2@xxx.co.jp | 03-xxxx-0002 | OOJIRO | User2.gif | 222.222.222.222 | ICID 2 |
| tag 3 | hum3@xxx.co.jp | 03-xxxx-0003 | OOSABURO | User3.gif | 333.333.333.333 | ICID 3 |

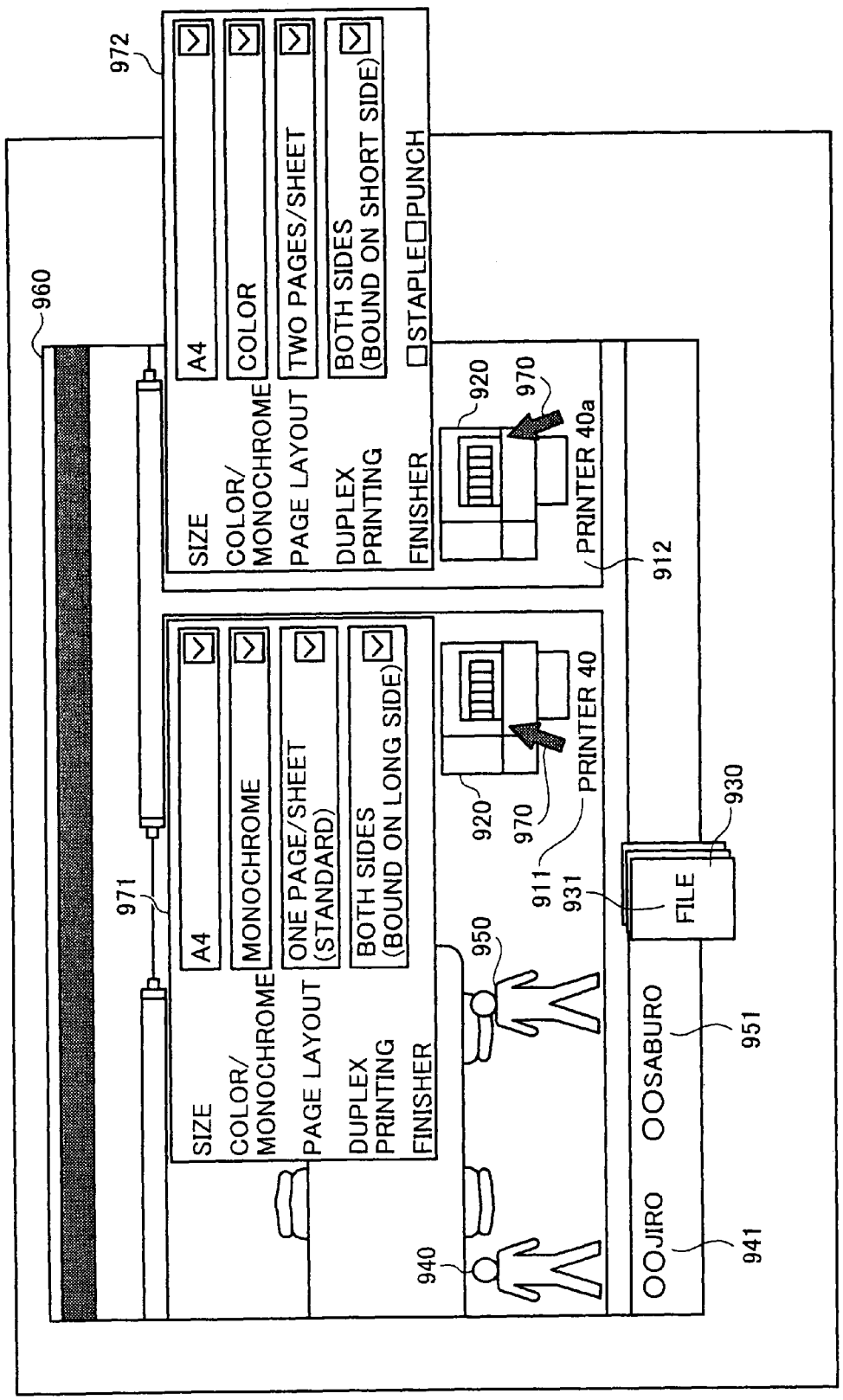

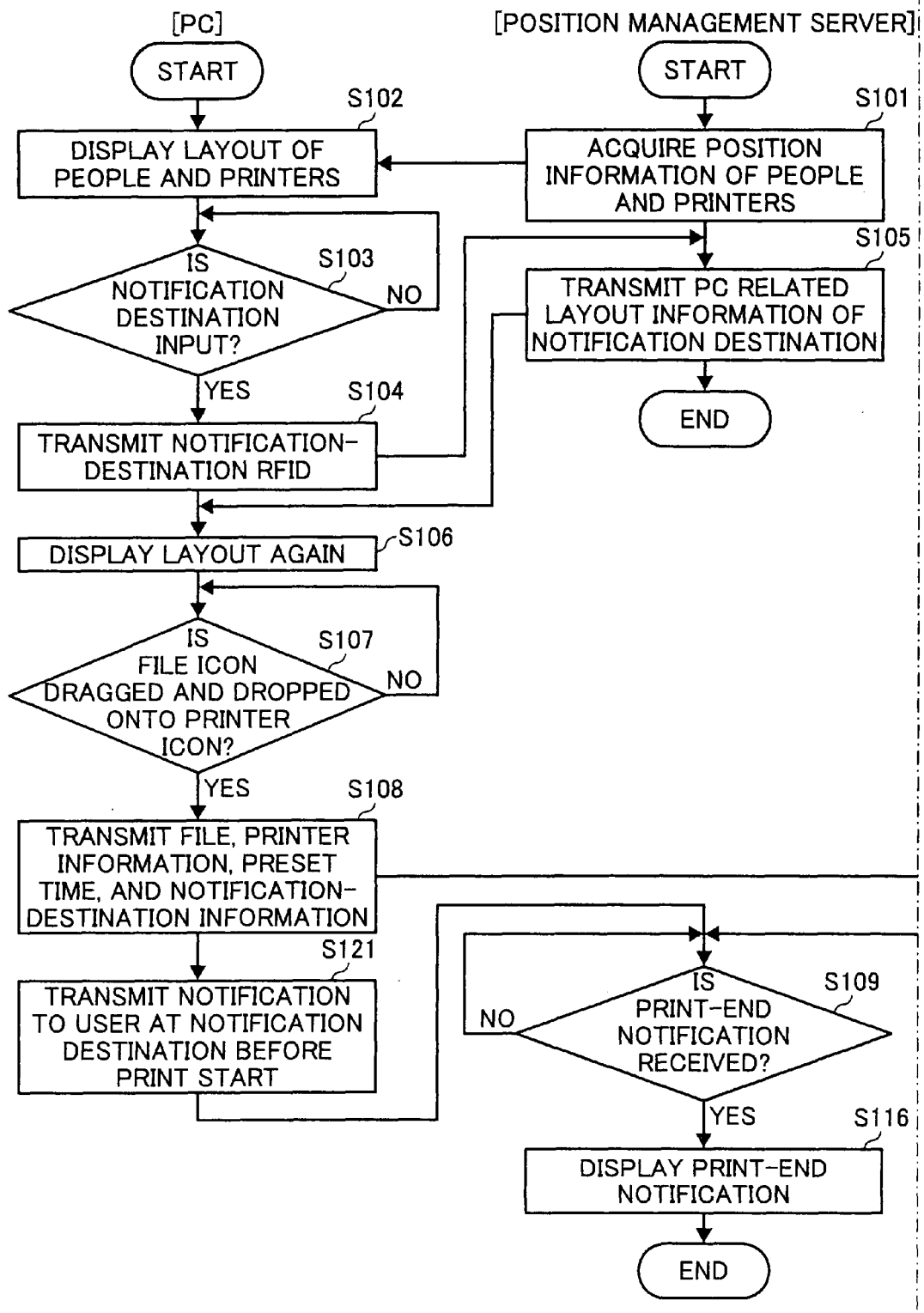

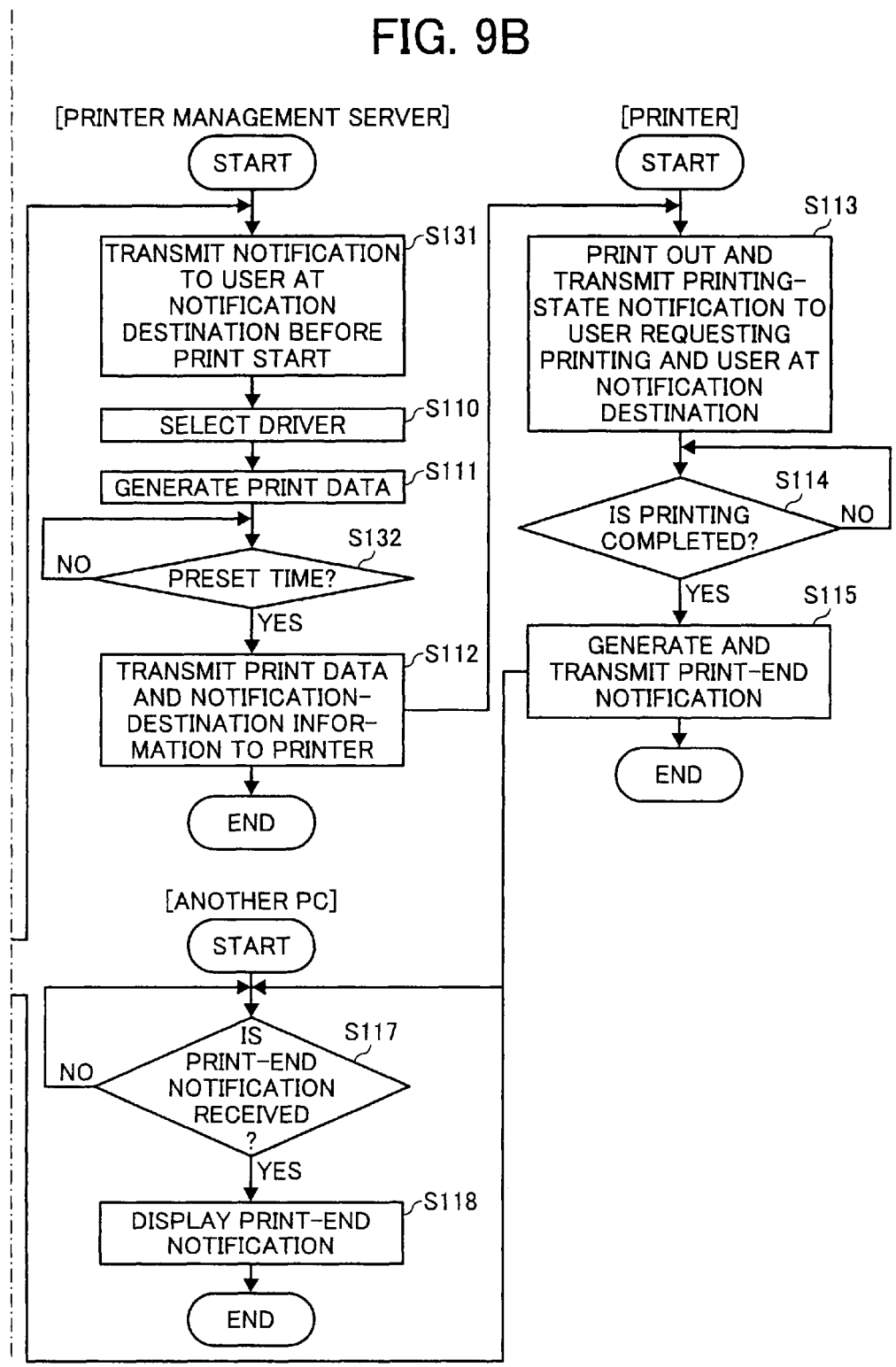

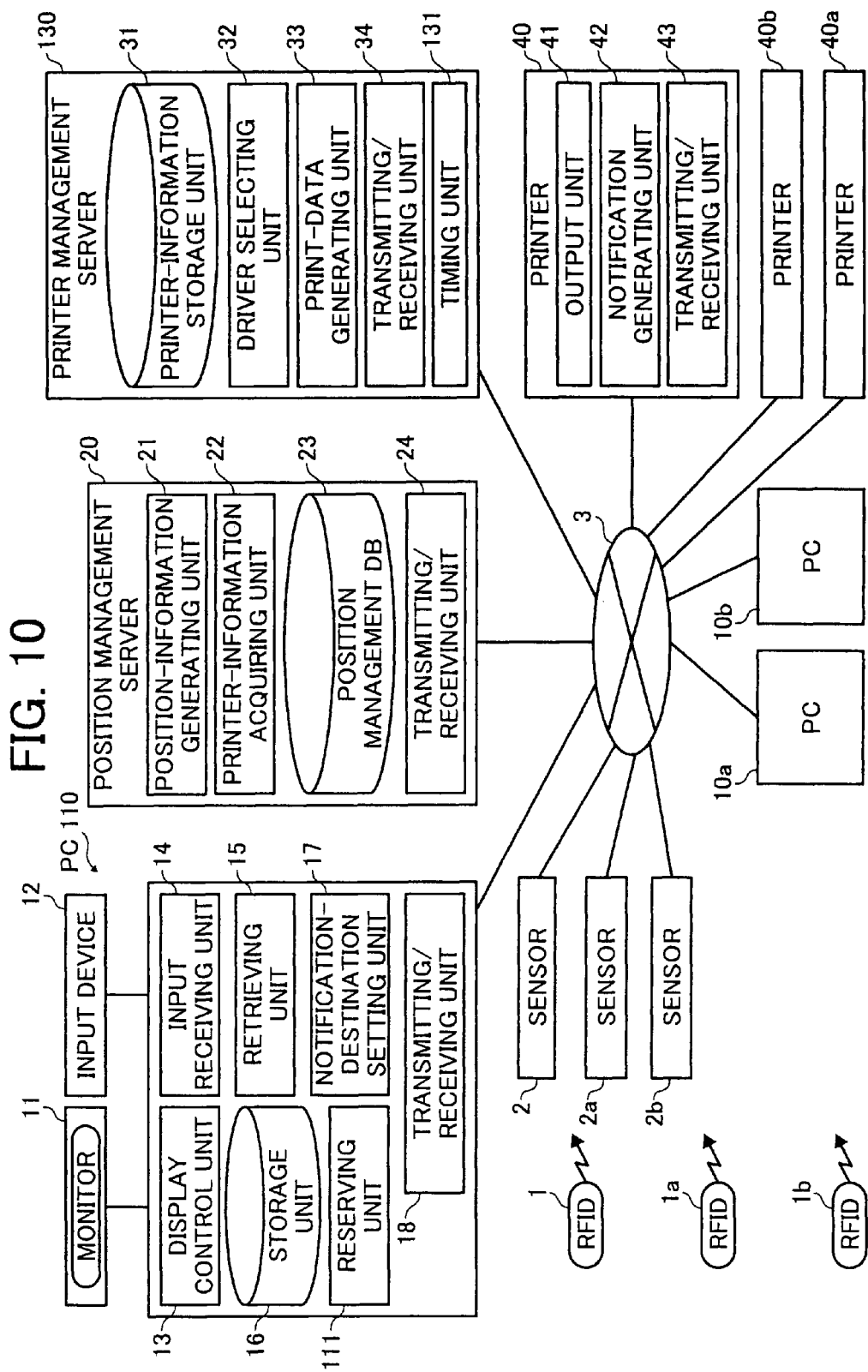

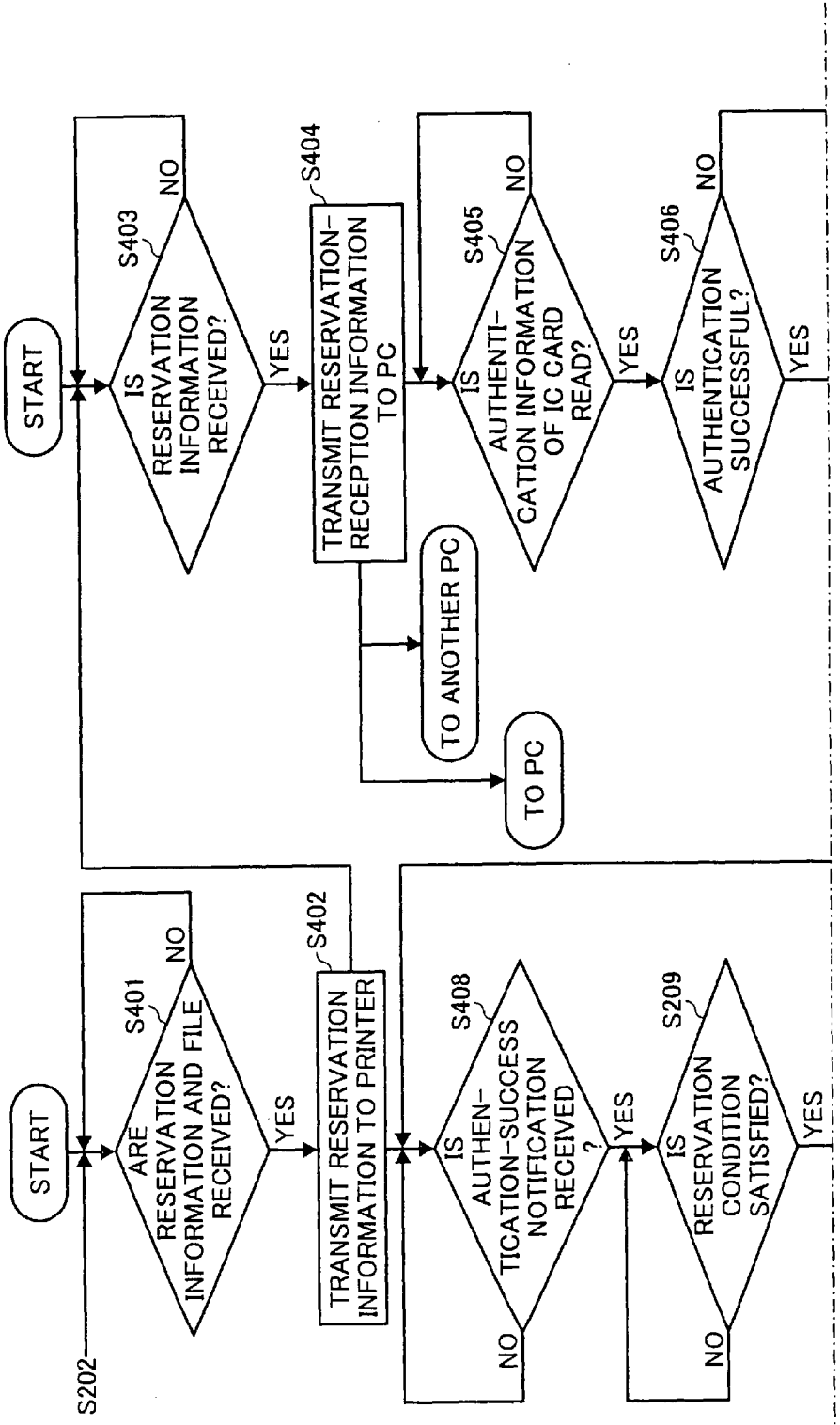

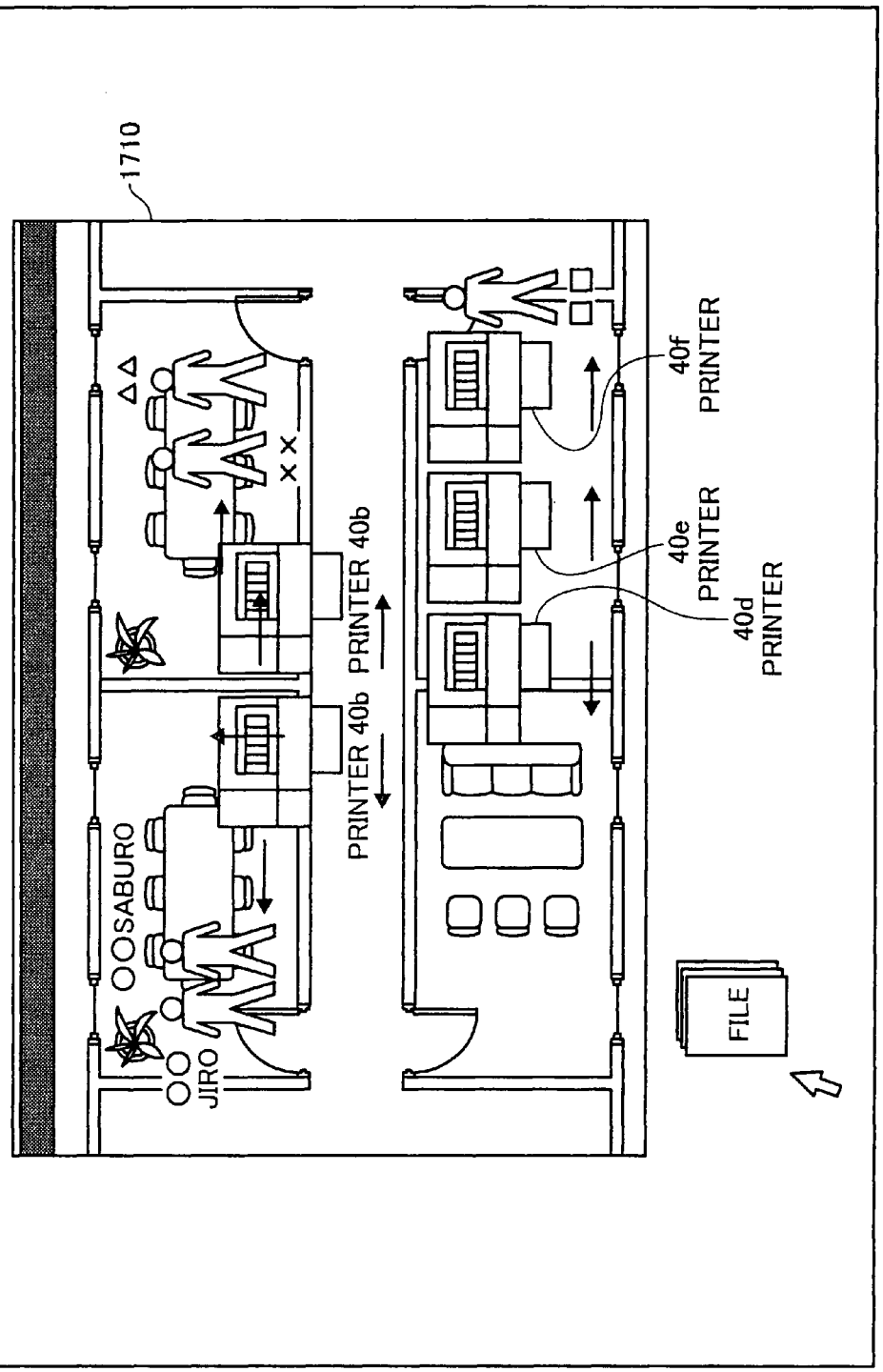

US 7,792,927 B2

OUTPUT REQUESTING APPARATUS VIA A NETWORK FOR USER-POSITION AND APPARATUS-POSITION INFORMATION

CROSS-REFERENCE TO RELATED APPLICATIONS

The present document incorporates by reference the entire contents of Japanese priority document, 2006-43197 filed in Japan on Feb. 20, 2006, Japanese priority document, 2006-43198 filed in Japan on Feb. 20, 2006, Japanese priority document, 2007-004921 filed in Japan on Jan. 12, 2007, and Japanese priority document, 2007-012022 filed in Japan on Jan. 22, 2007.

BACKGROUND

1. Technical Field of the Invention

This disclosure relates to an output requesting apparatus, an output apparatus, and a computer program product for requesting output of data.

2. Description of the Related Art

In recent years, a large number of printing apparatuses such as printers are installed in offices. The printing apparatuses are connected to a network, and accessible from various places. To use these printing apparatuses through the network, drag-and-drop operation is often used for initial setting of the printing apparatuses, printing, and the like. For example, printing is started when a file is dragged and dropped onto a printer icon.

In a print-control operation system disclosed in Japanese Patent Application Laid-Open No. 2001-337765, a print icon in which print conditions are set in advance and a file icon of a file to be printed are displayed on a display screen. When the file icon is dragged and dropped on the print icon on the display screen, setting of a printer indicated by the print icon is displayed. Printing of the file is performed under the print conditions set in the print icon. This enables a user to instruct printing and check print settings by an intuitive operation of dragging and dropping a file.

However, in the conventional technology, the user can find a position of a printer set by drag-and-drop operation relying only on the memory about installation of the printer. When there are printers of similar models, it is difficult to distinguish the printers. Besides, the user cannot grasp a position of a user personal computer (PC), positions of PCs of others, and positions of printers. When the user outputs a file from a printer that is not usually used, a new printer driver needs to be set. Therefore, complicated work is inevitable.

In the conventional technology, when a file icon is dragged and dropped onto the printer icon, it is difficult to determine a position of a printer to which the printer icon corresponds. It is also unclear whether a printer by which the user intends to print a file using the PC is a printer in a position optimum for the user. In this case, in particular, when the user outputs a document file from a printer near another person as easily as transmitting a facsimile to the person, a positional relation among the printers is unclear, and it is difficult to properly select a printer. Even if a printer is selected, setting work for the printer is necessary.

SUMMARY

According to an aspect of this disclosure, an output requesting apparatus is connected via a network to an output apparatus and a position-management server that manages user-position information indicating a position of a user and apparatus-position information indicating a position of the output apparatus. The output requesting apparatus includes a storage unit that stores therein data, a receiving unit chat receives, from the position-management server, the user-position information, the apparatus-position information, and a map image that indicates an area where the output apparatus is installable, a display control unit that arranges a user symbol indicating the user, an apparatus symbol indicating the output apparatus, and a data symbol indicating the data in the map image based on the user-position information and the apparatus-position information, and displays the map image on a display unit, an input unit that receives input to select the user symbol, the apparatus symbol, and the data symbol in the map image, and a transmitting unit that transmits, to the output apparatus corresponding to the apparatus symbol, a command to output the data corresponding to the data symbol, and notification-destination information including identification information of the user corresponding to the user symbol.

According to another aspect of this disclosure, an output apparatus is connected via a network to a first output requesting apparatus and a second output requesting apparatus. The output apparatus includes an output device that performs output processing, and an output managing device that is connected to the output device via the network and instructs the output device to perform the output processing. The output managing device includes a driver storage unit that stores therein output driver software, a first receiving unit that receives, from the first output requesting apparatus, a command to output data and notification-destination information including identification information of a user of the second output requesting apparatus, a driver selecting unit that selects output driver software corresponding to the output device from the driver storage unit, an output-data generating unit that generates output data from the data by executing the output driver software, and a first transmitting unit that transmits the output data and the notification-destination information to the output device, and transmits notification on data output to the second output requesting apparatus based on the notification-destination information. The output device includes a second receiving unit that receives the output data and the notification-destination information, an output unit that outputs the output data, and a second transmitting unit that transmits notification on the data output to the second output requesting apparatus based on the notification-destination information.

According to still another aspect of the present invention, a computer program product includes a non-transitory tangible medium having computer readable program codes embodied in the medium that, when executed, cause a computer to implement the above method.

The above and other aspects, features, advantages and technical and industrial significance of this disclosure will be better understood by reading the following detailed description of presently preferred embodiments of the invention, when considered in connection with the accompanying drawings.

BRIEF DESCRIPTION OF THE DRAWINGS

FIG. 3 is an example of contents of a tag-signal management table shown in FIG. 2;

FIG. 4 is an example of contents of a tag-ID-position management table shown in FIG. 2;

FIG. 5A is an example of contents of a printer-information management table shown in FIG. 2;

FIG. 5B is an example of contents of a printer-ability management table shown in FIG. 2;

FIG. 6 is an example of contents of a map-information management table shown in FIG. 2;

FIG. 7 is an example of contents of a user-information management table shown in FIG. 2;

FIG. 8B is an example of a layout image in which ability information of printers is displayed;

FIGS. 9A and 9B collectively show a flowchart of a printing process according to the first embodiment;

FIG. 10 is a functional block diagram of a printing system according to a second embodiment of the present invention;

FIGS. 15A and 15B collectively show a flowchart of a printing process according to the fourth embodiment;

FIGS. 17A and 17B collectively show a schematic for explaining a layout displayed on a monitor by a printing system according to a fifth embodiment of the present invention.

DETAILED DESCRIPTION OF THE PREFERRED EMBODIMENTS

Exemplary embodiments of the present invention are explained in detail below with reference to the accompanying drawings. In the embodiments explained below, such a printing system is explained as an example in which data is printed by a printer as an output apparatus in response to a request from a personal computer (PC) as an output requesting apparatus via a printer management server as an output-management server.

In a printing system according to a first embodiment of the present invention, a position management server detects a position of a user according to a detection signal from a radio frequency identification (RFID) tag (a radio tag) carried by the user. The position management server transmits map information including position information of the user and position information of a plurality of printers to a PC. The PC displays, on a monitor screen, a map image in which a user icon and printer icons are laid out. The user selects desired data (file) on the monitor by dragging and dropping a file icon onto an icon of a printer by which the user intends to print the file. The user also selects a user whom he/she notifies about printing. Then, the PC transmits the file selected, printer information and notification-destination information to a printer management server. The printer management server selects a driver according to the printer information received and generates print data of the file. The printer management server transmits the print data to the printer together with notification-destination information. The printer prints the print data received and transmits information on print notification to the user PC at the notification destination. The PC receives the print notification and displays the print notification on the monitor.

In this manner, in the printing system according to the first embodiment, the user displays a map image indicating a present position of the user or another user and layout of printers on the monitor of the PC, so that the user can visually checks a positional relation among the printers. The user drags and drops an icon corresponding to data that he/she wishes to print onto a printer icon of a printer to cause the printer to print the data. The PC displays printing state of the printer on the monitor of the PC. Consequently, the user can select, without complicated printer setting on the PC, a printer and print out desired data by the printer with simple operation and cause the PC of the user at the notification destination to indicate the printing state. This makes it possible to print out the data with simple operation, reduce complexity of data management, and perform highly convenient printing.

Figure 1:
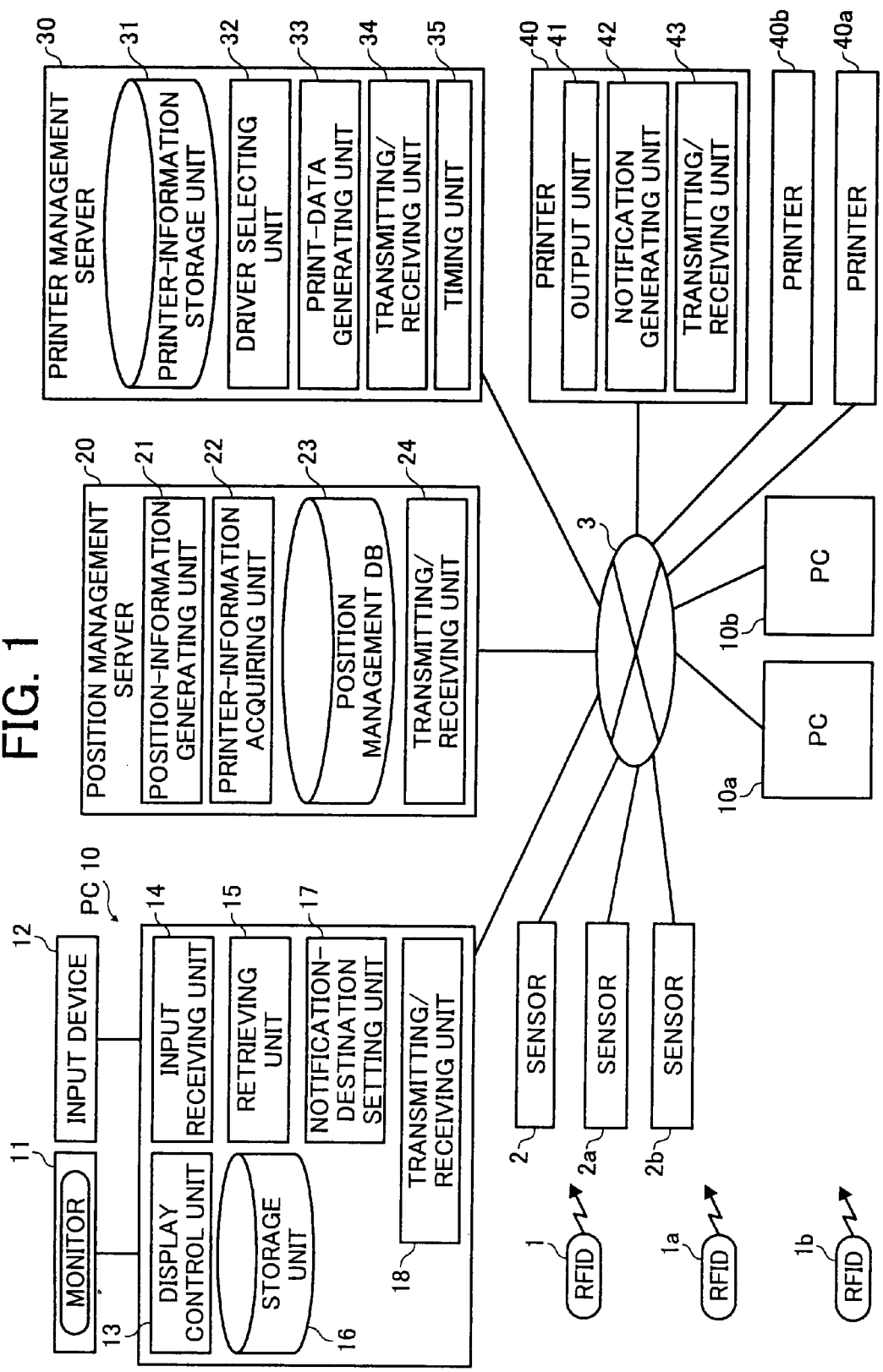
FIG. 1 is a functional block diagram of a printing system according to a first embodiment of the present invention.

FIG. 1 is a functional block diagram of the printing system according to the first embodiment. The printing system includes a personal computer (PC) 10, 10a, and 10b, a position management server 20, a printer management server 30, printers 40, 40a, and 40b, and sensors 2, 2a, and 2b, which are connected to one another via a network 3. Each of users entering an area in which the printing system is set carries an RFID tag (hereinafter, "RFID"). It is assumed herein that there are three users 1, 1a, and 1b who carry RFIDs 1, 1a, and 1b, respectively.

In FIG. 1, the three printers, the three sensors, and the three RFIDs are shown. However, the number can be arbitrary changed. The main parts of the PCs 10, 10a, and 10b have essentially the same structure, and component elements of the PCs 10a and 10b are not shown in FIG. 1.

The network 3 can be a telephone line, a radio network, or the Internet. The RFID 1 is an active radio tag that transmits an identification signal by a radio wave every one second. However, the RFID 1 is not limited to the active radio tag and can be a passive RFID. The RFID is used for detecting a position of a carrier thereof. Therefore, it is also possible to perform communication according to the Wi-Fi (wireless LAN) standard, the Bluetooth standard, or the ZigBee standard for actively emitting a radio wave using, for example, a cellular phone, a PC, a personal digital assistant (PDA), a wireless LAN tag, or an IC card.

In the area in which the printing system is set, the users carry the RFIDs 1 to 1b, respectively. The sensors 2 to 2b receive identification signals transmitted from the RFIDs 1 to 1b.

It is assumed that the user 1 who carries the RFID 1 operates the PC 10. In this explanation, an RFID is carried by a user. However, other than the human user, it is also possible to set the RFID in an object such as the printer 40 or the PC 10. In this case, for example, when the printer 40 or the PC 10 is a portable apparatus, even if the user moves carrying the apparatus, position information of the moving apparatus is acquired and a state of the moving apparatus is displayed on the monitor of the PC every moment. However, for simplification of the explanation, it is assumed that the PC and the printer are fixedly set. The RFID is a radio tag for detecting a position, and is sometimes simply referred to as "tag" below as appropriate.

The sensors 2, 2a, and 2b are set in the area to which this system is applied and receive identification signals from the RFIDs 1, 1a, and 1b. The sensors 2, 2a, and 2b transmit the identification signals received to an address and a port indicating the position management server 20 through the network 3.

The position management server 20 includes a position-information generating unit 21, a printer-information acquiring unit 22, a position management database 23, and a transmitting/receiving unit 24. The transmitting/receiving unit 24 receives the identification signals for the RFIDs transmitted from the sensors 2 to 2*b*. The position-information generating unit 21 generates position information of the RFIDs based on the identification signals received. The position management database 23 stores therein information on printers, sensors, RFIDs, maps, and users as described later. The position management database 23 is stored in a storage medium such as a hard disk (HD) or a memory. The transmitting/receiving unit 24 transmits the position information of the RFIDs generated, position information of the printers 40, 40*a*, and 40*b* acquired from the position management database 23, and map information to the PC 10. The position information of the printers and the position information of the PC set in the area are included in the map information.

In the following explanation, the RFIDs may be represented by the RFID 1, the sensors may be represented by the sensor 2, the PCs may be represented by the PC 10, and the printers may be represented by the printer 40. Main sections of the RFIDs, the sensors, the PCs, and the printers have identical structures, respectively.

The position-information generating unit 21 associates a sensor ID of the sensor 2 that detects the RFID 1 and position information of a position in which the sensor 2 is set. It is possible to specify this sensor ID from a correspondence relation between the sensor ID and an address of the sensor 2. It is possible to specify the address of the sensor 2 at a transmission source, which transmits a detection signal, according to a transmission source address included in a header of a packet used in transmitting the information.

The position-information generating unit 21 acquires the position information of the RFID. Since the RFID is carried by the user who operates the PC, the position-information generating unit 21 generates position information of the user.

Figure 2:
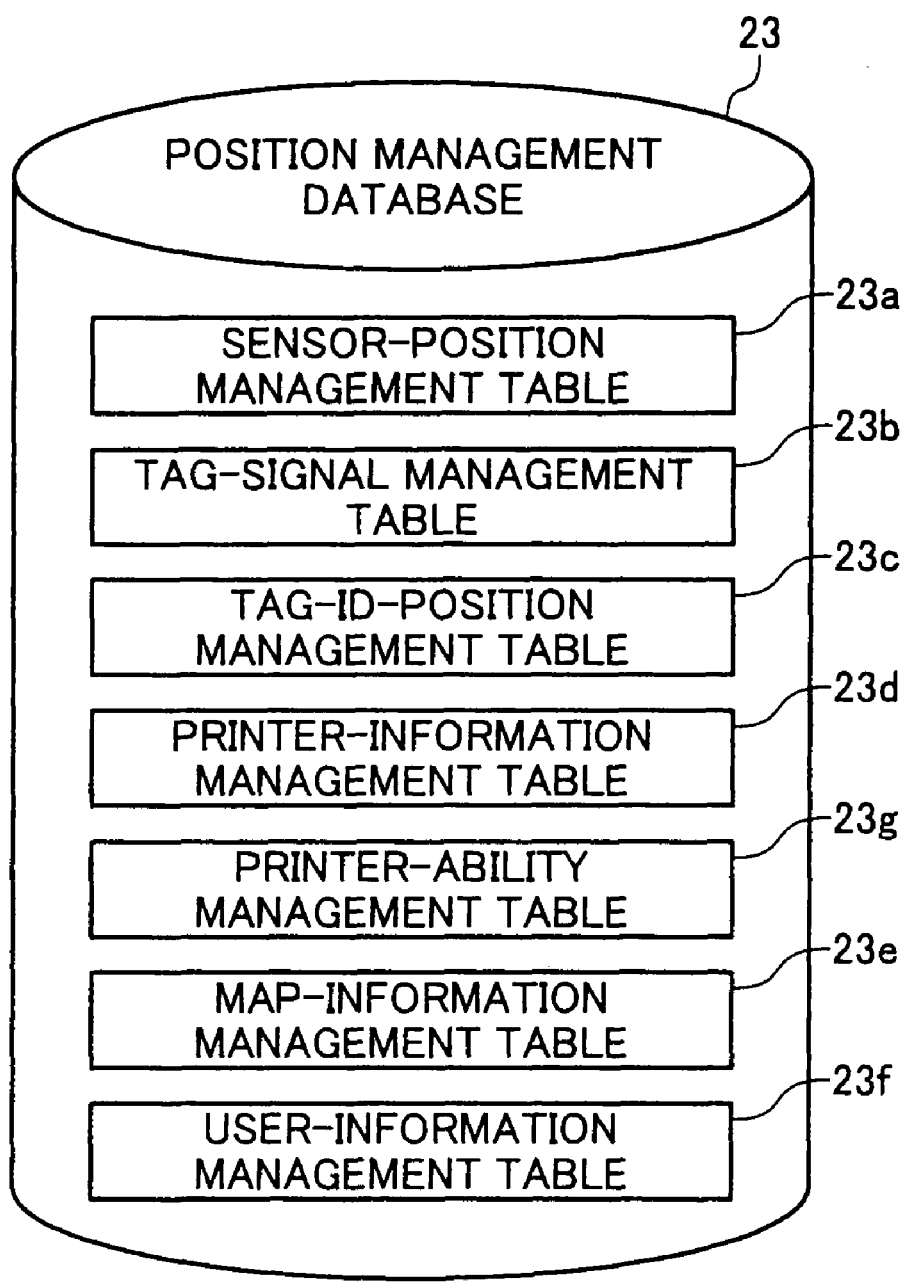
FIG. 2 is a functional block diagram of a position management database shown in FIG. 1.

FIG. 2 is a functional block diagram of the position management database 23. The position management database 23 includes a sensor-position management table 23*a*, a tag-signal management table 23*b*, a tag-ID-position management table 23*c*, a printer-information management table 23*d*, a printer-ability management table 23*g*, a map-information management table 23*e*, and a user-information management table 23*f*.

The sensor-position management table 23*a* contains information such as sensor ID, sensor position information, sensor address, and floor on which each sensor is set in association with one another. The sensor address is IP address for specifying the sensor. It is possible to specify sensor position by associating the sensor ID and the sensor address.

FIG. 3 is an example of contents of the tag-signal management table 23*b*. As shown in FIG. 3, the tag-signal management table 23*b* contains information such as tag ID, sensor ID, detection time in association with one another. This makes it possible to associate a tag, a sensor that detects the tag, and detection time. It is seen from data in FIG. 3 that the RFID 1 is presently near a sensor sns1.

FIG. 4 is an example of contents of the tag-ID-position management table 23*c*. As shown in FIG. 4, the tag-ID-position management table 23*c* contains information such as tag ID, floor, position information, and detection time in association with one another. Respective records in the tag-ID-position management table 23*c* are generated based on records in the sensor-position management table 23*a* and the tag-signal management table 23*b*. Position information and time information of detection of a tag is obtained by the tag-ID-position management table 23*c*.

In receiving tag detection signals from the sensors 2 to 2*b*, the transmitting/receiving unit 24 can specify IP addresses of the sensors by referring to headers of packets. The tag IDs, the detection signals, and the IP addresses of sensors are information decided to be transmitted from the sensors 2 to 2*b*. The transmitting/receiving unit 24 requests the position-information generating unit 21 to update the position management database 23 with information obtained by associating the detection time with the information received. The detection time is time when the sensors 2 to 2*b* detect the RFIDs 1 to 1*b*, i.e., present time when identification signals from the RFIDs are received from the sensors 2 to 2*b*.

The position-information generating unit 21 specifies sensor IDs according to the IP addresses of the sensors input from the transmitting/receiving unit 24 with reference to the sensor-position management table 23*a*. The position-information generating unit 21 associates the sensor IDs specified, the tag IDs input, and the detection time to update the records of the tag-signal management table 23*b*, the tag IDs and the sensor IDs of which coincide with the sensor IDs specified and the tag IDs input. Consequently, latest information is held for the tag IDs in the tag-signal management table 23*b*.

The position-information generating unit 21 acquires, every period decided in advance, the sensor ID and the detection time associated with the tag IDs held by the tag-signal management table 23*b* and the floors and the position information associated with the sensor IDs. The position-information generating unit 21 calculates position information associated with the tag IDs based on the information acquired and acquires position information of the RFIDs 1 to 1*b*.

The position management database 23 stores therein printer information of the printers 40, 40*a*, and 40*b* including icon image information, printer IDs as unique identification information, position information indicating actual arrangement positions, IP addresses and SIP addresses, models, and other image-related information such as display methods in association with one another.

FIG. 5A is an example of contents of the printer-information management table 23*d*. As shown in FIG. 5A, the printer-information management table 23*d* contains information such as printer ID, floor on which each printer is set, location name, position coordinates, address, model, file name of an icon as a symbol, and printer ability ID of each printer in the system in association with one another. The information on the printers registered in the printer-information management table 23*d* can be obtained by accumulating information input previously or downloaded via the network 3. The printer ability IDs are IDs for identifying print functions of the printers indicated by the printer IDs. The print functions corresponding to the printer ability IDs are registered in the printer-ability management table 23*g*.

FIG. 5B is an example of contents of the printer-ability management table 23*g*. In the printer-ability management table 23*g*, as shown in FIG. 5B, available print size, color/monochrome indicating whether the printer is capable of color printing or only monochrome printing, printable page layout, type of duplex printing, and finisher indicating whether stapling is possible, punching is possible, or both the stapling and the punching are impossible are associated with the printer ability ID as print functions.

In this embodiment, as described above, the printer-ability management table 23*g* in which the ability information as the print functions of the printers are classified for each of the printer ability IDs is provided. The printer ability IDs are associated with the printer IDs in the printer-information management table 23d to define the ability information for each of the printers. A way of deciding the ability information is not limited to this. For example, in the printer-information management table 23d, the ability information such as print size, color/monochrome, page layout, duplex printing, and finisher can be directly associated with the printer ID to define the ability information for each printer.

FIG. 6 is an example of contents of the map-information management table 23e. As shown in FIG. 6, the map-information management table 23e contains information such as map ID, floor indicated by the map, X coordinate and Y coordinate indicating a range to be displayed, and file name of each map image in association with one another.

FIG. 7 is an example of contents of the user-information management table 23f. As shown in FIG. 7, the user-information management table 23f contains information such as tag ID carried by each user, destination to which notification is to be sent, telephone number of the user, user name, name of an icon indicating the user, user PC address, and IC card ID carried by the user in association with one another. As described later, the IC card is used for authentication in acquiring a print. The user PC address is an address of a PC operated by the user.

The position-information generating unit 21 acquires position information of tags, detection time information, and file names of icons indicating owners of RFIDs from the position management database 23 with reference to the user-information management table 23f.

The printer-information acquiring unit 22 acquires the printer IDs, the floors on which printers are set, the location names, the position coordinates, the addresses, the printer types, and file names of icons of the printers 40, 40a, and 40b from the position-management database 23 with reference to the printer-information management table 23d.

The printer-information acquiring unit 22 acquires map information in which printers and users are displayed as icons based on the positions of the RFIDs detected and the printer IDs with reference to the map-information management table 23e. As these kinds of information, information corresponding to the position information of the RFIDs is acquired based on the position information.

The transmitting/receiving unit 24 transmits the position information of the RFIDs acquired, the IDs of the users as the owners of the RFIDs, the icons indicating the users, the printer information (the information registered in the printer-information management table 23d in FIG. 5A), the printer ability information corresponding to the printer ability IDs (the information registered in the printer-ability management table 23g in FIG. 5B), the icons indicating the printers, and the map images to the PC 10.

The PC 10 includes a monitor 11, an input device 12, a display control unit 13, an input receiving unit 14, a retrieving unit 15, a storage unit 16, a notification-destination setting unit 17, and a transmitting/receiving unit 18. In the following explanation, to pass a print of a file stored in the PC 10 of the user 1 to the user 1b on another floor, the user 1 operates the PC 10 to output the print in a printer near the user 1b and notifies the user 1b of printing of the file. Although data to be printed is explained as a fail, the data need not necessarily be in a file form.

The monitor 11 is a display device that displays characters and images.

The display control unit 13 receives the positions and the icons of the RFIDs 1 to 1b, the positions and the icons of the printers 40 to 40b, the ability information of the printers, and the map information transmitted from the position management server 20. The display control unit 13 causes the monitor 11 to display the location of the users and the printers on a screen of the monitor 11 as icons as symbols. A browser or dedicated software is used for the display on the screen of the monitor 11.

The display control unit 13 also causes the monitor 11 to display icons and the like of data stored in the storage unit 16 on the screen of the monitor 11. Further, the display control unit 13 causes the monitor 11 to display text information such as "Ichiro" and "beside the entrance of 8F" on the display screen of the monitor 11 that indicates the name of a user and the location of a printer as actual position information of the printer by letters or characters.

The icons are various data and processing functions displayed on the display screen of the monitor 11 as pictures or pictographs. In this embodiment, the icons of the printers and the users are displayed on the display screen of the monitor 11 as indication of the printers and the users. However, the indication of the printers and the users are not limited to the icons. A symbol including an icon and various data and processing functions indicated by a sign, a character string, and the like can be displayed.

The input device 12 is a pointing device such as a mouse, a trackball, or a track pad, a keyboard, or the like. A user performs operation by drag-and-drop and operation on the screen displayed on the monitor 11 using the input device 12. The drag-and-drop is a method of operating the mouse or the like and is operation for continuously performing drag and drop. The term "drag" means operation for moving a pointer while button of the mouse or the like is kept pressed and "drop" means operation for releasing the button of the mouse or the like at a moving destination of the drag.

The input receiving unit 14 receives the drag and drop operated from the input device 12. The input receiving unit 14 also receives other inputs from the input device 12.

Figure 8A:
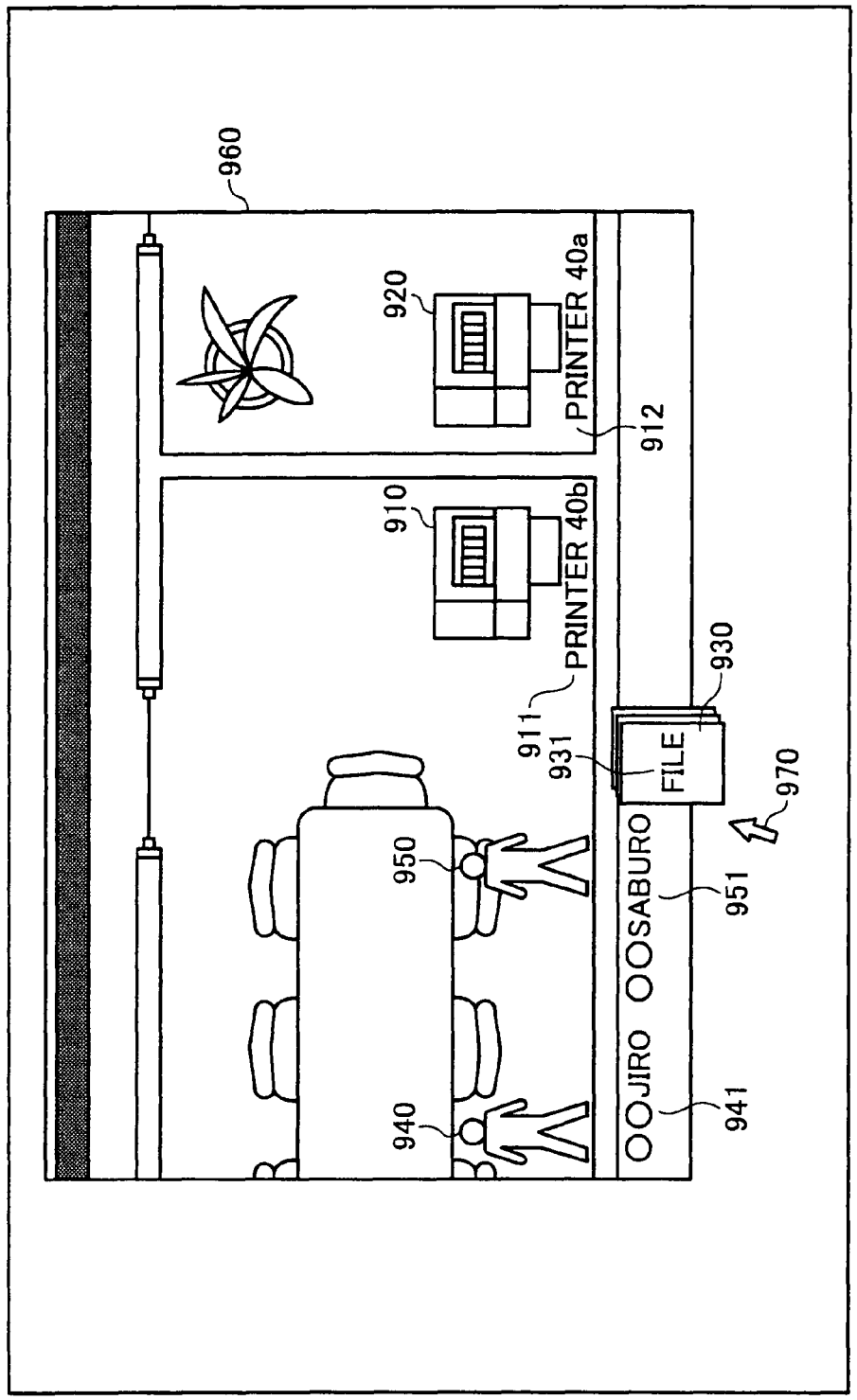
FIG. 8A is an example of a map image that depicts a people, PCs, and printers laid out therein displayed on a display screen of a monitor shown in FIG. 1.

FIG. 8A is an example of a map image that depicts people, PCs, and printers laid out therein displayed on the display screen of the monitor 11. As shown in FIG. 8A, a layout image 960 of an office is displayed on the display screen of the monitor 11 according to information transmitted from the position management server 20. In the layout image 960 of the office displayed on the monitor 11, icons 910 and 920 and text information 911 and 912 of the printers 40 and 40a, an icon 930 and text information 931 of a file, and icons 940 and 950 and text information 941 and 951 of people are arranged in relative positions. This floor is the third floor. A pointer 970 for performing operation using the input device 12 is displayed in a form of an arrow on the monitor 11.

In FIG. 8A, Jiro is the user 1a who carries the RFID 1a and operates the PC 10a on the third floor. Saburo is the user 1b who carries the RFID 1b and operates the PC 10b on the third floor. Ichiro (not shown) is the user 1 who carries the RFID 1 and operates the PC 10 from the first floor.

When a user moves the pointer 970 of the mouse onto the icons 910 and 920 of the printers 40 and 40a and points the icons 910 and 920, the input receiving unit 14 receives pointed inputs of the icons 910 and 920. The display control unit 13 extracts ability information corresponding to the printers 40 and 40a of the icons 910 and 920 pointed from ability information (print functions) received and displays the ability information extracted to be superimposed on the layout image 960. This allows the user to select an appropriate printer and print the file after grasping the print functions of the printers 40 and 40a.

FIG. 8B is an example of a layout image in which ability information of printers is displayed. As shown in FIG. 8B, when the pointer 970 of the mouse is pointed on the icon 910 of the printer 40, the ability information of the printer 40 is displayed to be superimposed on the layout image 960. When the pointer 970 of the mouse is pointed on the icon 920 of the printer 40a, the ability information of the printer 40a is displayed to be superimposed on the layout image 960.

It is assumed that the user 1 wishes to print a file stored in the PC 10 of the user 1 by the printer 40b set near the user 1b, hand over the printed file to the user 1b, and notify the user 1b of the printing. The user 1 inputs the name of the user 1b through the input device 12.

When the name of the user 1b is input, the input receiving unit 14 receives the name. The storage unit 16 has a user information management table as shown in FIG. 7. The user information management table contains information such as tag ID held by each user, transmission destination to which a notification is transmitted, telephone number and name of the user, file name of an icon indicating the user, addresses of PC operated by the user, and IC card held by the user in association with one another.

The retrieving unit 15 refers to this user-information management table according to the user name input and acquires an ID of the RFID 1b carried by the user 1b corresponding to the name. The transmitting/receiving unit 18 transmits identification information of the RFID 1b of the user 1b to the position management server 20.

In the position management server 20, the position-information generating unit 21 acquires position information of the RFID 1b based on the identification information of the RFID 1b received. The printer-information acquiring unit 22 selects the printer 40 in a position near the user 1b based on the position information of the RFID 1b acquired. The transmitting/receiving unit 24 returns the position information of the RFID 1b, a file name of the icon of the RFID 1b, the position information of the printer 40, a file name of the icon of the printer 40, and the map information of the third floor to the PC 10.

In the PC 10, the display control unit 13 displays a map of the third floor, where the user 1b is present now, on the screen of the monitor 11 based on these pieces of information received. The display control unit 13 displays, on the map, the icon 950 of the user 1b in a position where the RFID 1b is detected and displays the icon 910 of the printer 40 in a position of the printer 40 near the user 1b as shown in FIG. 8A.

However, it is also possible that, when the user 1 inputs "Saburo", the name of the user 1b, from the input device 12, this information is transmitted from the transmitting/receiving unit 18 to the position management server 20, the position management server 20 refers to the position management database 23, the position-information generating unit 21 generates position information of the user 1b, and the printer-information acquiring unit 22 transmits a printer icon and map information corresponding to the position information to the PC.

The user 1 drags and drops the icon 930 of the file stored in the PC 10 of the user 1b onto the printer icon 910 corresponding to the printer 40b near the user 1b. The input receiving unit 14 acquires a printer ID on which the icon 930 is dropped by the drag-and-drop input received and receives a print command. The input receiving unit 14 receives an input of time specified by the user 1, at which printing is to be performed, as preset time.

The notification-destination setting unit 17 generates notification-destination information for notifying the PC 10 of the user 1b and the PC 10 of the user 1 of the printing by the printer 40b onto the icon of which the file icon 930 has been dropped. The notification-destination information contains addresses of the PC 10b and the PC 10 as the transmission source of the print command. An email address of the user 1b can be included in the notification-destination information. The notification-destination information can further include addresses of all PCs to which the printing is reported. Thus, the notification-destination setting unit 17 can set a notification destination to which a state of printing by the printer is reported. The printing state includes, for example, print wait and print end.

The transmitting/receiving unit 18 transmits the ID of the printer 40b designated by the drop operation, the file designated by the drag operation, and the notification-destination information generated by the notification-destination setting unit 17 to an address of the printer management server 30. The transmitting/receiving unit 18 also transmits information on the preset time specified by the user 1 to the address of the printer management server 30. Further, the transmitting/receiving unit 18 transmits a notification before print start to an address of the PC 10b of the user 1b (or an address of the user 1b), which is a notification destination indicated by the notification-destination information.

The printer management server 30 includes a printer-information storage unit 31, a driver selecting unit 32, a print-data generating unit 33, a timing unit 35, and a transmitting/receiving unit 34.

The transmitting/receiving unit 34 receives the printer ID information, the file, and the notification-destination information transmitted from the PC 10. The transmitting/receiving unit 34 transmits the notification before print start to the address of the PC 10b of the user 1b (or the address of the user 1b), which is the notification destination indicated by the notification-destination information.

The printer-information storage unit 31 stores therein printer driver software corresponding to each of the printers connected via the network 3 in association with printer IDs.

The driver selecting unit 32 selects printer driver software from the printer-information storage unit 31 based on the printer ID received by the transmitting/receiving unit 34. Here, the driver selecting unit 32 selects driver software corresponding to the printer 40 on which the icon 930 is dropped on the PC 10. However, the driver selecting unit 32 can select suitable driver software by discriminating an extension and a property of the file corresponding to the icon 930.

The print-data generating unit 33 is implemented by executing the printer driver software selected by the driver selecting unit 32. The print-data generating unit 33 converts the file received into print data to be printed by the printer 40b.

The transmitting/receiving unit 34 transmits the print command received, the print data converted, and the notification-destination information to an address of the printer 40b designated.

The timing unit 35 receives information on the preset time set on the PC 10 and judges whether it is the preset time. When it is the preset time or the preset time has elapsed, the timing unit 35 controls the transmitting/receiving unit 34 to start transmission processing for transmitting the print data generated by the print-data generating unit 33 and the notification-destination information to the printer 40b designated.

In this embodiment, the transmitting/receiving unit 34 is controlled to start transmission of the print data and the notification-destination information at the preset time or upon elapse of the preset time. However, the present invention is not limited to this. For example, at the preset time or upon elapse of the preset time, the timing unit 35 can control the print-data generating unit 33 to start the print data generation processing or control the driver selecting unit 32 to start the driver selection processing.

The printer 40 includes an output unit 41, a notification generating unit 42, and a transmitting/receiving unit 43. The transmitting/receiving unit 43 receives the print command, the print data, and the notification-destination information transmitted from the printer management server 30. The transmitting/receiving unit 43 transmits a printing-state notification to the address of the PC 10 of the user 1 (the address of the user 1), who has requested printing, and the address of the PC 10b of the user 1b (or the address of the user 1b), which is the notification destination indicated by the notification-destination information.

The output unit 41 prints the print data on a recording sheet or the like according to the print command received. The notification generating unit 42 generates a notification for notifying the PC 10 of the execution of printing. The transmitting/receiving unit 43 transmits the notification according to the notification-destination information received.

The PC 10, which instructs printing of a file corresponding to the icon 930, and the PC 10b used by the user 1b are designated as notification destinations. The notification can include status information such as print wait, print end, and printing. In this explanation, print end is notified. The notification generating unit 42 generates a notification when the output unit 41 has finished printing.

The notification transmitted to the PC 10 indicates that the output of the file from the PC 10b has been completed and a receiver of the file is the user 1b. The notification transmitted to the PC 10b indicates that the output of the file from the PC 10b has been completed and a receiver is the user 1b. The transmitting/receiving unit 43 transmits these print-end notifications to the PC 10 of the user 1 and the PC 10b of the user 1b, respectively.

In this embodiment, the present invention is applied to the printer as an image forming apparatus. However, the image forming apparatus is not limited to the printer. It is also possible to apply the present invention to a multifunction product and the like including a printing function.

FIGS. 9A and 9B collectively show a flowchart of a printing process according to the first embodiment. The sensor 2 detects RFIDs carried by users and transmits a detection signal to the position management server 20.

In the position management server 20, the position-information generating unit 21 generates tag position information at every moment according to signals of tags transmitted from the sensors 2 to 2b. The printer-information acquiring unit 22 acquires a plurality of pieces of printer information and a laid-out map image of places where printers are set from the position management database 23. The printer-information acquiring unit 22 transmits tag position information, printer information, file names of icons of the printers, and the map image to the PC 10 (step S101).

The PC 10 receives position information of the users corresponding to the RFIDs detected, position information of a plurality of printers, the map image, and the like and causes the monitor 11 to display user icons corresponding to present positions of the users and the map image including the layout of the printer icons on the screen of the monitor 11 (step S102). Because the PC 10 is operated by the user 1, first, the position management server 20 transmits image information and the like based on a detected position of the RFID 1 carried by the user 1.

The input receiving unit 14 receives a notification destination of print-end notification to report the completion of printing (step S103). When the user 1 inputs a name of the user 1b, to whom a file is handed over through the input device 12, the input receiving unit 14 receives the input (Yes at step S103). The retrieving unit 15 refers to the user information management table in the storage unit 16, acquires ID information of the RFID 1b carried by the user 1b, and transmits the ID information to the position management server 20 (step S104).

The position management server 20 specifies position information of the RFID 1b and the printer 40b near the RFID 1b based on the ID of the RFID 1b. The position management server 20 transmits position information and an icon of the user 1b, position information and an icon of the printer 40b, and map image Map3 to the PC 10 (step S105).

The PC 10 displays, based on these pieces of information, the icon of the user 1b and the icon of the printer 40b near the user 1b on the screen of the monitor 11 laid out on the map information Map3 as shown in FIG. 8 (step S106).

The user drags and drops the file icon 930 onto the icon 910 of the printer 40b to cause the printer 40b to print a file. The input receiving unit 14 detects whether the drag and drop operation is provided (step S107). The user inputs a desired time at which printing is performed as a preset time, and the input receiving unit 14 receives the preset time input. When it is detected that a drag and drop operation is provided (Yes at step S107), the transmitting/receiving unit 18 of the PC 10 transmits the file, the ID of the PC 10 at the transmission source, the address of the PC 10b at the destination of the notification, the ID of the printer 40b, and the preset time to the printer management server 30 (step S108). The transmitting/receiving unit 18 transmits the notification before print start to the PC 10b of the user 1b (or the address of the user 1b), which is the notification destination indicated by the notification-destination information (step S121). The transmitting/receiving unit 18 judges whether status information to be displayed on the screen of the monitor 11 is received (step S109).

When the printer management server 30 receives the ID information of the printer 40b, the notification-destination information, and the file transmitted from the PC 10, the transmitting/receiving unit 34 transmits the notification before print start to the PC 10b of the user 1b (or the address of the user 1b), which is the notification destination indicated by the notification-destination information (step S131). Such transmission of the notification before print start is performed on the PC 10 at step S121. Thus, the transmission need not be performed on the printer management server 30.

The driver selecting unit 32 selects a driver corresponding to the printer 40b from information on drivers stored in the printer-information storage unit 31 (step S110). The print-data generating unit 33 generates print data from the file with the driver selected (step S111). The timing unit 35 judges whether it is the preset time or the preset time has elapsed (step S132). When it is not the preset time yet (No at step S132), the printer management server enters a wait state. On the other hand, when it is the preset time (Yes at step S132), the printer management server 30 transmits the print data to the printer 40b together with the ID information of the PC 10 and the PC 10b, i.e., destinations of print-end notification (step S112).

In the printer 40b, the output unit 41 prints the print data received. The transmitting/receiving unit 43 transmits a printing-state notification (e.g., printing or a print error if occurs) to the address of the PC 10 of the user 1 (or the address of the user 1), who requests the printing, and the address of the PC 10b of the user 1b (or the address of the user 1b), which is the notification destination indicated by the notification-destination information (step S113). The printer management server 30 can be notified of the printing state to transmit a printing-state notification therefrom.

The notification generating unit 42 judges whether the printing has been completed (step S114). When the printing has been completed (Yes at step S114), the notification generating unit 42 generates notification indicating the completion of printing, which is sent to the PC 10 and the PC 10b. The transmitting/receiving unit 43 transmits the notification to the PC 10 and the PC 10b (step S115).

In the PC 10, the transmitting/receiving unit 18 judges whether the print-end notification has been received from the printer 40 (step S109). Upon receiving the print-end notification (Yes at step S109), the display control unit 13 displays the print-end notification that the printing has been completed on the screen of the monitor 11 (step S116).

Similarly, in the PC 10b designated as the notification destination, a transmitting/receiving unit (not shown) judges whether the print-end notification has been received from the printer 40b (step S117). Upon receiving the print-end notification (Yes at step S117), the display control unit 13 displays the print-end notification that the printing is completed on the screen of the monitor 11 (step S118).

As described above, with the printing system according to the first embodiment, the user 1 intuitively grasps a present position of the user 1b and positions of printers on the monitor of the PC, selects a suitable printer, for example, the printer 40b near the user by dragging and dropping an icon, and causes the printer 40b to print a file. After printing is completed, the PC 10b of the user 1b displays print-end notification on the monitor thereof. Consequently, a user can select, without complicated printer setting on a PC, a printer with simple operation and cause the printer to print a file. After printing is completed, the PC notifies the user of the completion of printing. Thus, it is possible to reduce complexity of data management after the output with simple operation and perform highly convenient printing.

Moreover, a user can specify a time for outputting a print as preset time, and printing is performed at the preset time. Thus, when the user hands a print to another user, it is possible to prevent people other than the designated user from inspecting the print and realize security of the print.

In the above explanation, the apparatus that executes printing is the PC. However, actually, it is possible to apply the present invention to any apparatus as long as the apparatus instructs printing process.

For example, a printer and a notification destination are displayed on a display screen of a cellular phone and an email attached with a file is transmitted to the printer management server 30. This makes it possible to perform printing same as that explained in the first embodiment.

Moreover, a printer and a notification destination are displayed on a display screen of a personal digital assistant (PDA) and a file is transmitted to the printer management server 30 via a wireless LAN. This makes it possible to perform printing same as that explained in the first embodiment.

In the above explanation, as the notification, a notification for notifying a user of the completion of printing is transmitted after printing is completed. Besides, information for indicating a state of a printer, for example, status information indicating a lack of paper, ink shortage, a type of a sheet set, and the like can be notified during printing, offline, and in other cases.

If the user 1 who operates the PC 10 sets the user 1 himself/herself as a destination to which a print is handed over, the user 1 can directly receive the print by the user 1 himself/herself.

In the first embodiment, position identification is performed by using a radio tag. However, instead of the radio tag, for example, a wired LAN can be applied. In the wired LAN, locations of desk-top PCs are registered in the same manner as image forming apparatuses and communication is performed with IP addresses or MAC addresses as unique IDs. Because a user knows a position of a PC that the user is using, the user can identify a printer in a position near the PC.

FIG. 10 is a functional block diagram of a printing system according to a second embodiment of the present invention. A PC 110 is basically similar to the PC 10 except for the presence of a reserving unit 111. A printer management server 130 is basically similar to the printer management server 30 except for a timing unit 131.

The printing system according to the second embodiment is different from the printing system according to the first embodiment in that, on a PC, when a user at a destination of print-end notification is selected, the reserving unit 111 reserves printing and generates reservation information for printing.

In the printer management server 130, the timing unit 131 receives the reservation information, generates print data according to a designated printer based on the reservation information, and causes the printer to transmit the print data to a designated PC. When the timing unit 131 receives the reservation information, the timing unit 131 transmits reservation notification that a print command is reserved to a PC at a reservation source of the print command and a PC at a destination of print-end notification.

With this constitution, it is possible to specify a time for outputting a print, a printer, a notification destination, and the like for printing. That is, it is possible to designate a time and a place and cause a printer in the place to output a print at the time. Because a notification of reservation is sent to a print command source and a PC at a reception destination, it is possible to reduce complexity of data management after printing.

A user may wish to output a print from a printer connected to a LAN and receive the print on time, for example, before a meeting begins in another branch office in the morning on the next day. Such a case is explained below.

In FIG. 8A, the user 1 inputs information on another branch office through the input device 12 and the retrieving unit 15 performs retrieval, causes the position management server 20 to transmit arrangement information including people, printers, and map information on a floor in another branch office, and causes the monitor 11 to display the arrangement information. In another branch office shown in FIG. 7, when the user 1 visits the branch office, to open a door and cause the printer 40b closest to the door to output a file corresponding to the file icon 930, the user 1 drags and drops the icon 930 onto the icon 910. Input can be provided through the input device 12 in reservation mode. It is assumed that the reservation mode is set. The user 1 inputs information indicating 7:50 on the next day, which is a printing time, and PC information at a notification destination as an input in the reservation mode. The input receiving unit 14 receives this reservation input.

The reserving unit 111 generates reservation information for instructing execution of printing according to the reservation input and the file and the printer information designated by drag and drop operation of the icon. The transmitting/receiving unit 18 transmits the reservation information and the file to the printer management server 130.

The printer management server 130 reads the reservation information received by the timing unit 131. The printer management server 130 generates reservation-reception information, which is information indicating that printing is reserved, and transmits the reservation-reception information to the PC 10 and the PC 10b using the transmitting/receiving unit 34.

At preset time 7:50 on next morning, the driver selecting unit 32 selects a driver, and the print-data generating unit 33 generates print data according to the driver. The transmitting/receiving unit 34 transmits the print data and notification to a designated printer. As in the case of the first embodiment, the printer 40b performs printing and transmits a print-end notification to a notification destination indicated by the reservation information.

Figure 11A:
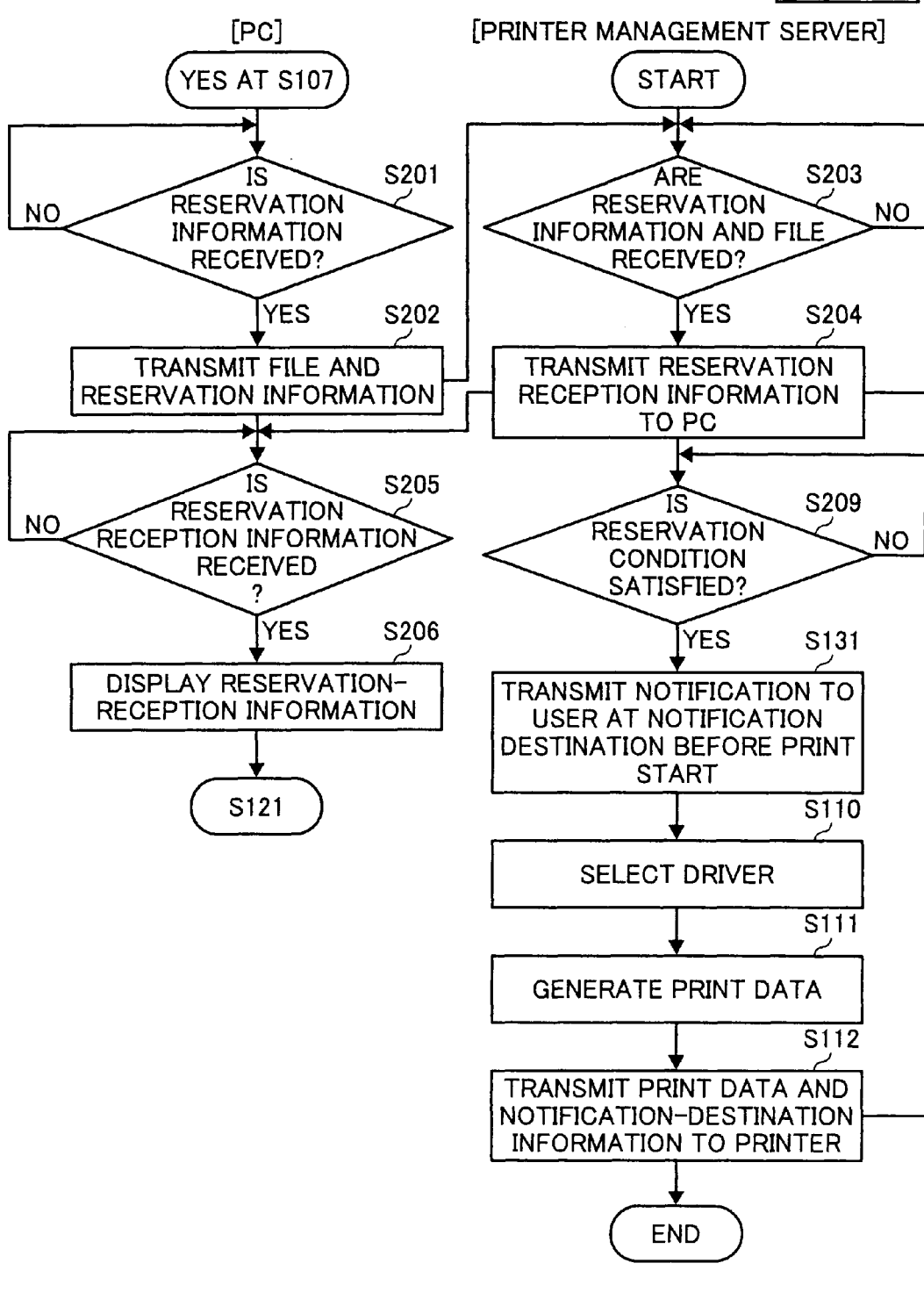
FIGS. 11A and 11B collectively show a flowchart of a printing process according to the second embodiment.
Figure 11B:
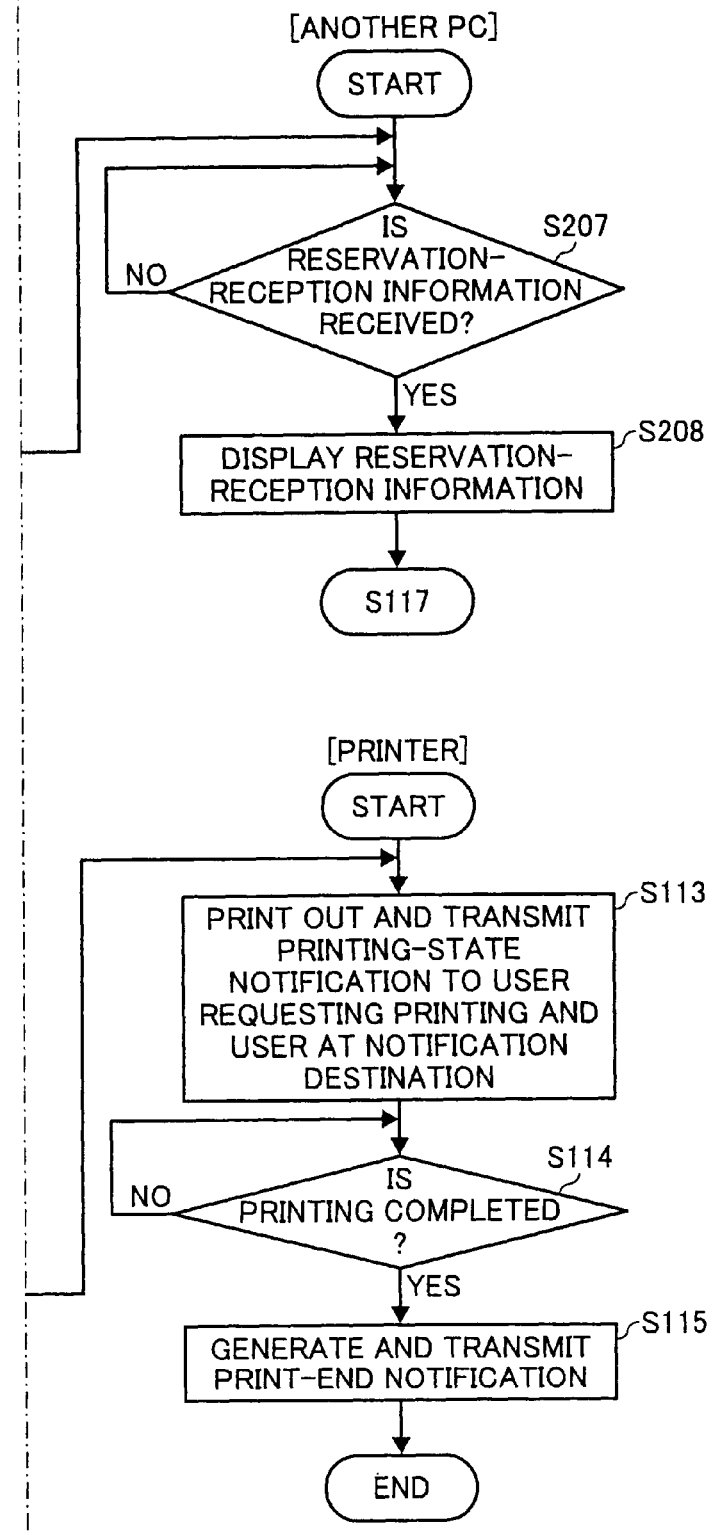

FIGS. 11A and 11B collectively show a flowchart of a printing process according to the second embodiment. The process up to step S107 is the same as that in the first embodiment, and the process after step S107 is mainly explained. When drag and drop operation is performed for a file and a printer (Yes at step S107), the input receiving unit 14 detects whether reservation information is received (step S201). When the reservation information is received (Yes at step S201), the reserving unit 111 generates reservation information and the transmitting/receiving unit 18 transmits the file and the reservation information to the printer management server 130 (step S202).

In the printer management server 130, when the reservation information and the file are received (Yes at step S203), the timing unit 131 reads the reservation information, generates information indicating that the reservation is accepted, and transmits the information to the transmission destination. In other words, the timing unit 131 transmits the information to the address of the PC 10 at the transmission source (or the address of the user 1) and the address of the PC 10b operated by the user 1b who receives a print (or the address of the user 1b) (step S204).

When the reservation-reception information is received (Yes at step S205), the PC 10 displays the reservation-reception information on the screen of the monitor 11 (step S206). The process after step S206 is the same as that at step S109 and the subsequent steps for judging whether print-end notification is received, and the same explanation is not repeated.

When the reservation-reception information is received (Yes at step S207), the PC 10b displays the reservation-reception information on the screen of the monitor (step S208). The process after step S208 is the same as the process at step S117 and the subsequent steps for judging whether print-end notification is received, and the same explanation is not repeated.

The timing unit 131 judges, based on the reservation information, whether reservation condition is satisfied (step S209). For example, when a time to perform printing has been specified as a reservation condition, the timing unit 131 determines that the reservation condition is satisfied at the specified time (Yes at step S209). The driver selecting unit 32 selects a driver (step S110), and the print-data generating unit 33 generates print data (step S111). The process at step S110 and the subsequent steps is the same as that in the first embodiment, and the same explanation is not repeated.

When the print data and the like are transmitted from the printer management server 130 (step S112), the printer 40b receives the print data and the like and starts printing (step S113). The process at step S113 and the subsequent steps is the same as that in the first embodiment, and the same explanation is not repeated.

A time and a printer for outputting a print, a notification destination, and the like are specified to cause the printer to perform printing according to specified items, a user can cause the printer to output a print and receive the print at a desired place on the time. Thus, a printing system with high convenience is realized. When the user hands a print to another user, it is possible to prevent people other than the designated user from inspecting the print and realize security of the print. Moreover, a notification destination is set to inform a user at the notification destination that a reservation is made. Thus, it is possible to reduce complexity of data management after printing.

When a user other than the user 1 is designated on the PC 10b of the user 1, the reserving unit 111 can indicate on the screen of the monitor 11 that reservation notification is transmitted to the other user. Consequently, when the user hands a print to another user who is generally in a place different from the place of the user 1, it is possible to prevent a wrong selection of a printer to output the print.

A screen to specify a destination of the reservation notification can be displayed on the monitor every time. Consequently, destination of notification related to printing can be checked, and it is possible to confirm an output destination and improve security management.

As the reservation information, other than the print reservation by time, for example, printing can be set to start when the printer management server detects that a printer at a specified destination is turned on.

A printing system according to third embodiment of the present invention is different from the printing system in the second embodiment in that, when reservation information is received by a PC, in receiving a print from a printer, the printing system receives authentication information from a user who attempts to receive the print in the printer, a printer management server compares the authentication information with authentication information received from the printer, and, only when the two pieces of authentication information match successfully, the printer output from a reserved printer is performed.

Consequently, when a reservation is made with a receiver designated, authentication information of the receiver is compared with the authentication information received from the printer and, only when the authentication information of the receiver is verified, printing is performed. Thus, people other than the receiver cannot perform printing, and it is possible to improve security of information and reduce complexity of data management after printing.

Figure 12:
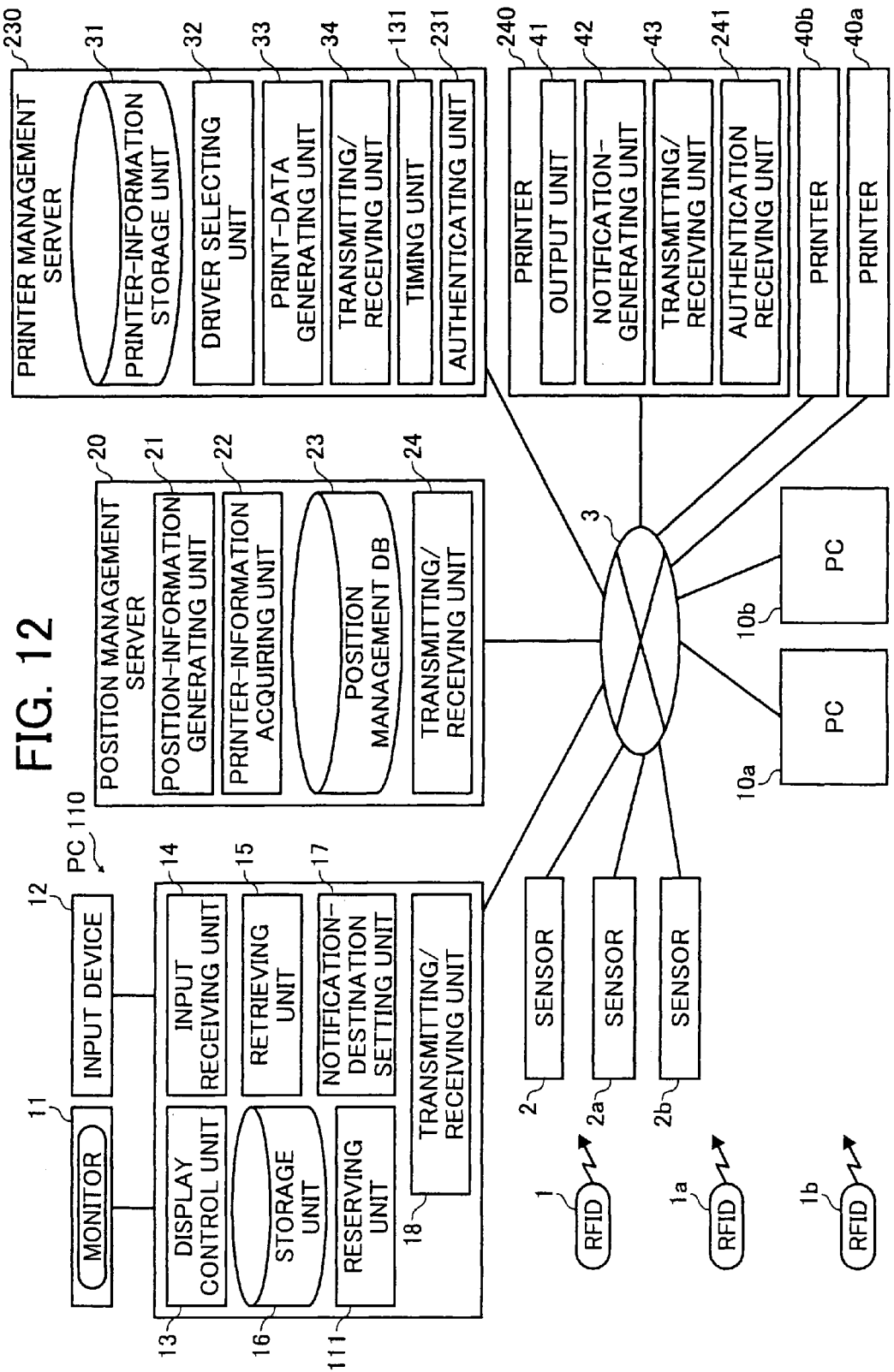
FIG. 12 is a functional block diagram of a printing system according to a third embodiment of the present invention.

FIG. 12 is a functional block diagram of the printing system according to the third embodiment. A printer management server 230 is basically similar to the printer management server 130 except for the presence of an authenticating unit 231. A printer 240 is basically similar to the printer 40 except for the presence of an authentication receiving unit 241.

The authentication receiving unit 241 reads authentication information from an IC card carried by the user and causes the printer 240 to transmit the authentication information to the printer management server 230. The authenticating unit 231 acquires authentication information of the user and compares the authentication information of the user with the authentication information received from the printer 240. When the authentication is successful and the timing unit 131 judges that other reservation conditions are satisfied, the timing unit 131 executes a reserved print command and generates print data from a file already received.

The user 1 may wish to ensure that only the user 1 outputs a print and receive the print from a printer connected to a LAN, for example, before a meeting in another branch office begins in the morning on the next day. In such a case, reservation and printing are performed in the same manner as explained in the second embodiment, authentication process different from that in the second embodiment is mainly explained.

When the user 1 performs print reservation on the PC 110, the user 1 designates the user 1 himself/herself as a receiver. The reserving unit 111 generates reservation information including receiver information and transmits the reservation information to the printer management server 230. The user 1 can designate the user 1b as a receiver.

The authenticating unit 231 holds authentication information of users (e.g., ID and password of each user) in advance. The authentication information can be received or downloaded from the position management server 20 or can be included in reservation information received from the PC 10.

The authenticating unit 231 reads the reservation information and sets the authentication information of the user 1 as authentication information of a receiver for printing reserved.

The user 1 carries an IC card that contains authentication information. To receive a reserved print, the user 1 inserts the IC card into a slot of the authentication receiving unit 241 so that the authentication receiving unit 241 reads the authentication information. The transmitting/receiving unit 43 transmits the authentication information to the printer management server 230.

The authenticating unit 231 compares the authentication information of the user 1 set in advance with the authentication information received from the printer 240. When the authentication is successful, the authenticating unit 231 notifies the timing unit 131 of the successful authentication. Upon receiving the notification of the successful authentication, the timing unit 131 checks whether there is another reservation condition based on the other reservation information. If any, the timing unit 131 starts printing when the reservation condition is satisfied.

When the authentication is not successful, the authenticating unit 231 causes the timing unit 131 not to perform subsequent processes and end the process.

Figure 13:
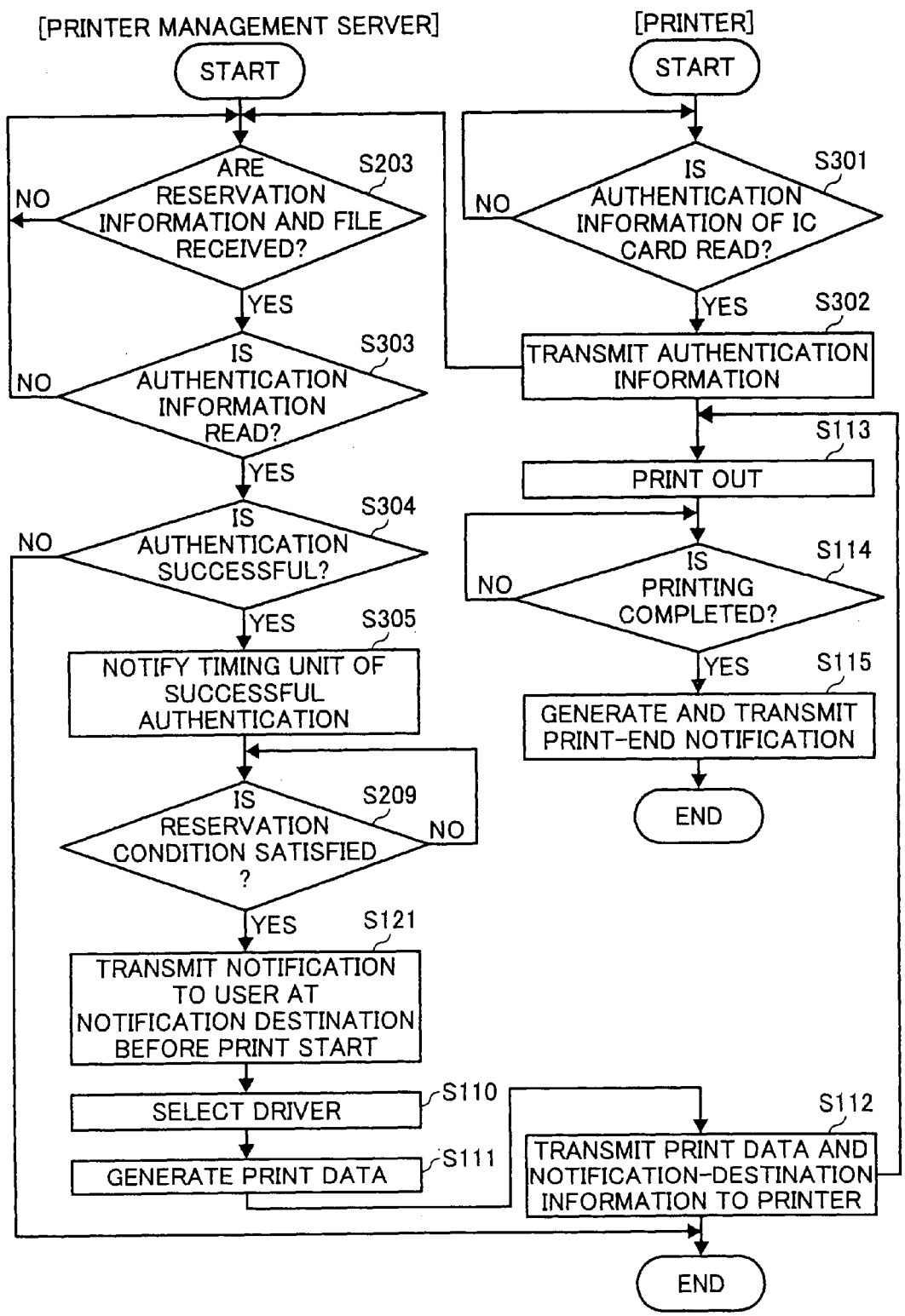
FIG. 13 is a flowchart of a printing process according to the third embodiment.

FIG. 13 is a flowchart of a printing process according to the third embodiment. The process different from that in the first and the second embodiments is mainly explained.

The authentication receiving unit 241 of the printer 240 is in a state of detection of authentication information of an IC card (step S301). When the authentication information is read (Yes at step S301), the authentication receiving unit 241 transmits the authentication information read from the transmitting/receiving unit 43 to the printer management server 230 (step S302).

The printer management server 230 receives reservation information and a file from the PC 10 (Yes at step S203). The reservation information includes authentication information of a receiver. The authenticating unit 231 of the printer 240 is in a state of reading of authentication information (step S303). When the authentication information is read (Yes at step S303), the authenticating unit 231 compares the authentication information of the user 1 included in the reservation information with the authentication information received (step S304).

When the authentication is successful (Yes at step S304), the authenticating unit 231 notifies the timing unit 131 of the successful authentication (step S305). The timing unit 131 checks whether there is another reservation condition based on the reservation information. If any, the timing unit 131 judges whether the reservation condition is satisfied (step S209). When the other reservation condition is satisfied (Yes at step S209), the driver selecting unit 32 selects a driver (step S110) and the print-data generating unit 33 generates print data (step S111). The process after step S111 is the same as that in the second embodiment, and the same explanation is not repeated.

On the other hand, when the authentication is not successful (No at step S304), the authenticating unit 231 ends the printing process.

In this way, in the printing system according to the third embodiment, when a reservation is made with a receiver designated, authentication of the receiver is performed using an IC card in a printer, authentication information of the receiver is compared with authentication information received from the printer, and, only when the authentication information of the receiver is verified, printing is performed. Thus, people other than the designated receiver cannot perform printing, and it is possible to improve security of information output and reduce complexity of data management after printing.

A printing system according to a fourth embodiment of the present invention is different from the printing system according to the third embodiment in that, when reservation information is input in a PC and a user performs authentication and receives a print in a printer, authentication information is sent to the printer by an input from the PC, authentication is performed in the printer, and, when the authentication is successful, a printer management server causes a reserved printer to perform printing.

Consequently, when a reservation is made with a receiver designated, authentication information of the receiver is compared with the authentication information received from the printer and, only when the authentication information of the receiver is verified, printing is performed. Thus, people other than the receiver cannot perform printing, and it is possible to improve security of information and reduce complexity of data management after printing.

Figure 14:
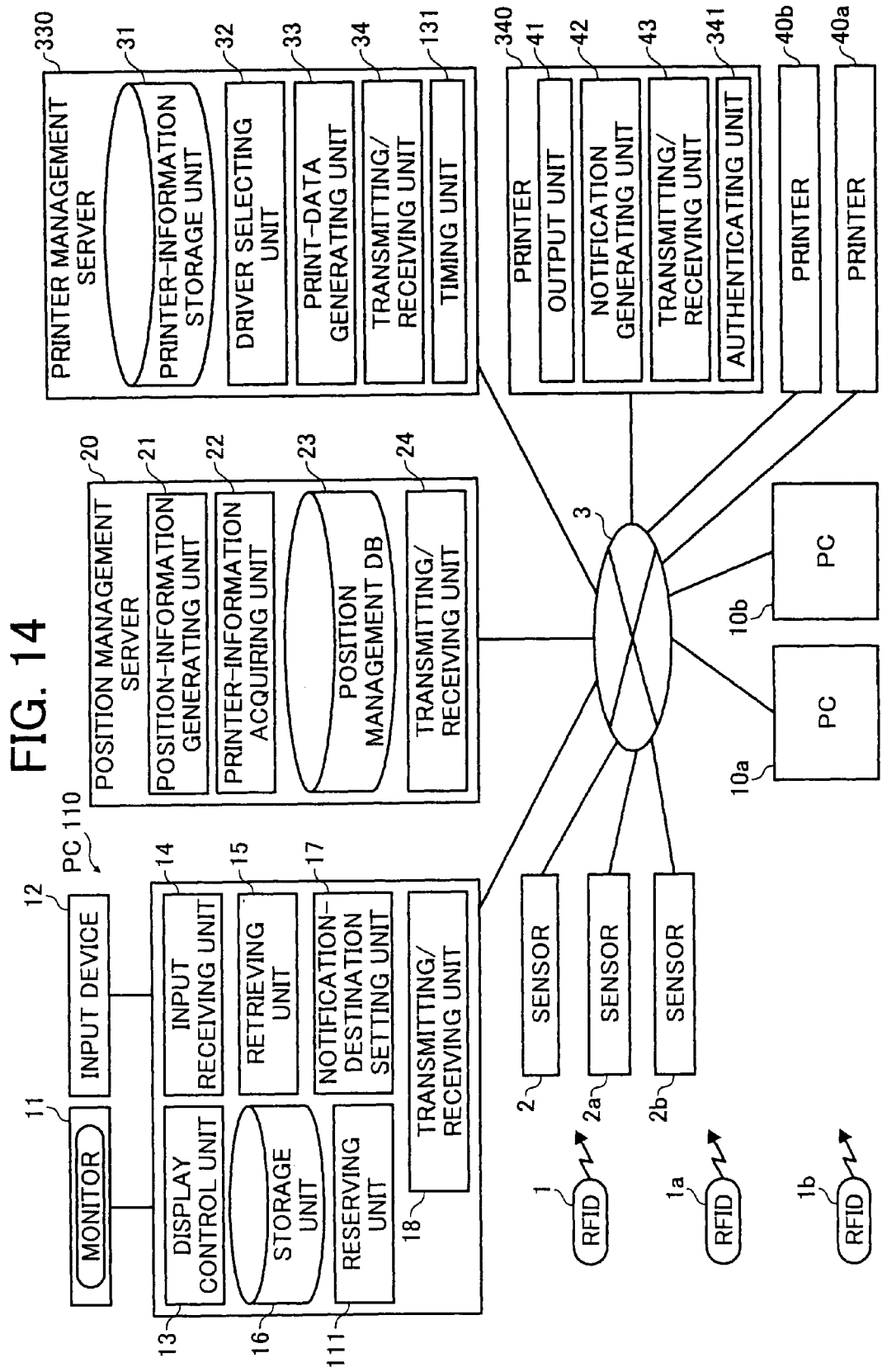
FIG. 14 is a functional block diagram of a printing system according to a fourth embodiment of the present invention.

FIG. 14 is a functional block diagram of the printing system according to the fourth embodiment. A printer 340 is basically similar to the printer 240 except for an authenticating unit 341.

The authenticating unit 341 of the printer 340 receives authentication information for reservation information transmitted from the PC 10. The authenticating unit 341 includes an authentication receiving unit (not shown) that reads authentication information of an IC card carried by a user. The authenticating unit 341 compares the authentication information read by the authentication receiving unit with authentication information already received. When the authentication is successful, the authenticating unit 341 causes the transmitting/receiving unit 43 to transmit notification indicating the successful authentication to a printer management server 330.

The printer management server 330 receives the notification. When there is another reservation condition, the timing unit 131 starts printing upon determining that the reservation condition is satisfied based on the reservation information. When the authentication is not successful, the authenticating unit 231 stops subsequent processes and ends the process.

Figure 15B:
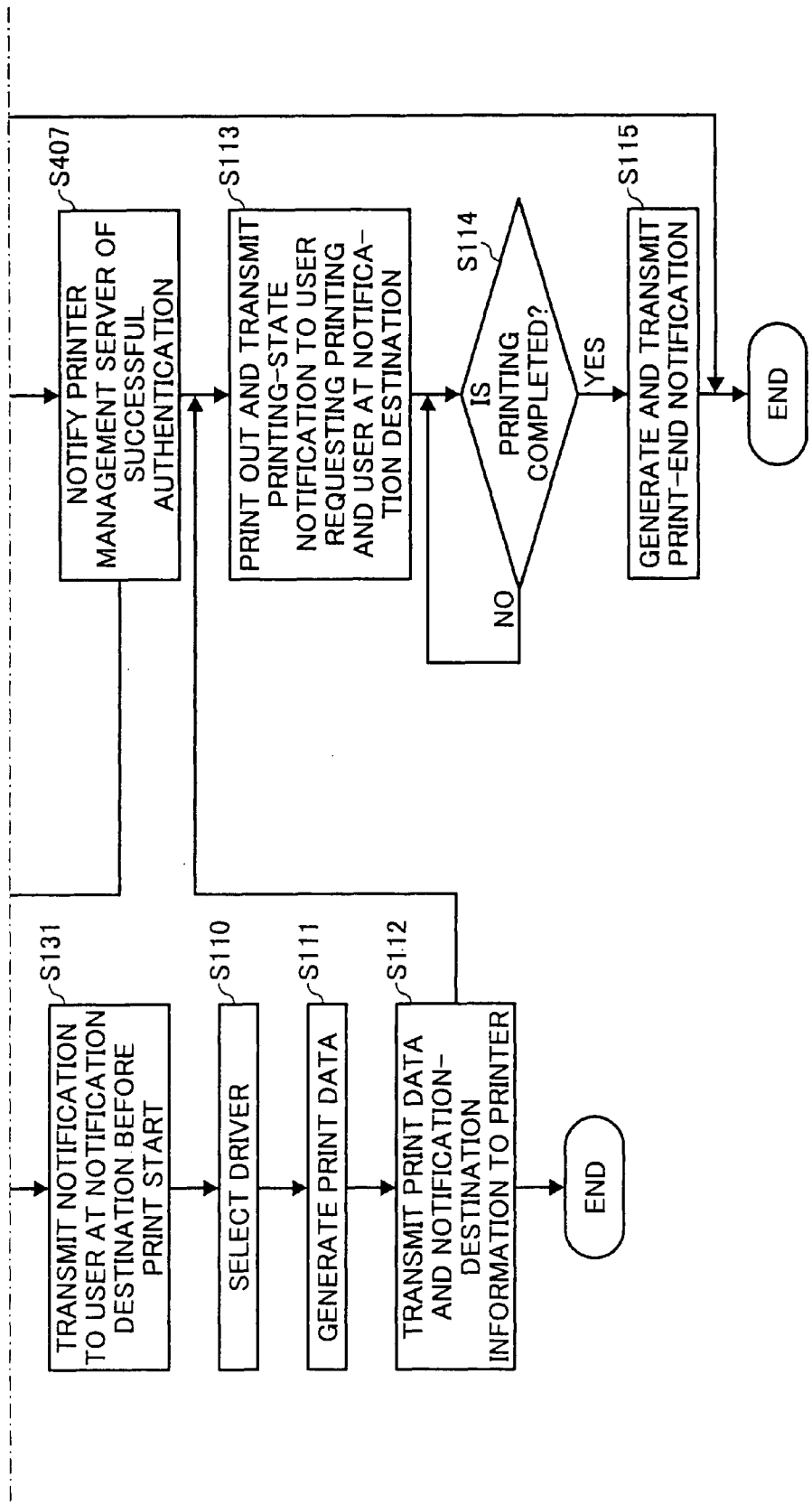

FIGS. 15A and 15B collectively show a flowchart of a printing process according to the fourth embodiment. The process different from that in the first to the third embodiments is mainly explained. The printer management server 330 is in a state of detection of transmission of a file and reservation information from the PC 10 (step S401). When it is judged that the file and the reservation information are received (Yes at step S401), the printer management server 330 transmits the reservation information to the printer 340 (step S402).

The printer 340 detects whether the reservation information is received (step S403). When the reservation information is detected (Yes at step S403), the printer 340 transmits reservation-reception information to the PC 10 (step S404). The PC 10 and the PC 10b receive the reservation-reception information and display the reservation-reception information (steps S205 and S207, already described).

The authenticating unit 341 is in a state of detection of authentication information of an IC card (step S405). When the authentication information is read (Yes at step S405), the authenticating unit 341 compares the authentication information with authentication information from the PC 10 (step S406). When the authentication is successful (Yes at step S406), the authenticating unit 341 transmits an authentication-success notification to the printer management server 330 (step S407).

When the printer management server 330 receives the authentication-success notification (Yes at step S408), the timing unit 131 judges whether another reservation condition is satisfied (step S209). When the reservation condition is satisfied (Yes at step S209), as described previously, the driver selecting unit 32 selects a driver (step S110) and the print-data generating unit 33 generates print data (step S111). The process after step S111 is the same as that in the second embodiment, and the same explanation is not repeated.

On the other hand, when the authentication is not successful (No at step S406), the authenticating unit 231 ends the printing process.

In this way, according to the printing system according to the third embodiment, when a reservation is made with a receiver designated, authentication of the receiver is performed using an IC card in a printer, authentication information of the receiver is compared with authentication information received from the printer, and, only when the authentication information of the receiver is verified, printing is performed. Thus, people other than the designated receiver cannot perform printing, and it is possible to improve security of information output and reduce complexity of data management after printing.

As an authentication system, it is also possible to use an information terminal instead of the IC card and execution authentication by exchanging authentication information with a printer according to the Bluetooth standard. This is because it is easy to acquire the authentication information in the printer. In this case, reservation information transmitted from the PC to the printer contains identification information received from a position management server, and authentication of an information terminal can be easily performed with the Bluetooth function.

The information terminal can be a cellular phone. In that case, a cellular phone number can be used as the authentication information. The cellular phone number, which is unique information with high identification accuracy, is exchanged between the cellular phone and the printer with the Bluetooth function, highly convenient authentication function is displayed with a simple structure. In this case, when the reservation information is transmitted from the PC to the printer, it is possible to perform authentication of the information terminal by including the cellular phone number in the printer as identification information received from the position management server.

When it is impossible to use the Bluetooth function, it is possible to use an email address of the cellular phone as authentication information using email transmission from the cellular phone to an address of the printer. The email address of the cellular phone, which is unique information with high identification accuracy, is used as the authentication information, it is possible to surely perform an authentication operation automatically and reduce complexity of manual authentication input.

When the information terminal has a communication function and a display function, it is possible to transmit reservation-reception information for the file from the PC and cause the information terminal to display the reservation-reception information. The information terminal is desirably a cellular phone.

It is possible to receive reservation-reception information from the PC in the cellular phone via the Internet and a portable telephone network and display a name of the file, the reservation for which is received, on a display screen. Consequently, even a user remote from the PC can quickly receive the reservation-reception information using the cellular phone, which is the information terminal with high convenience and certainty.

It is also possible to display files received in this manner on a screen of the cellular phone, so that a desired file can be selected and only the file is printed. By printing only a necessary file, a printing system with high adaptability and convenience is realized.

Figure 16:
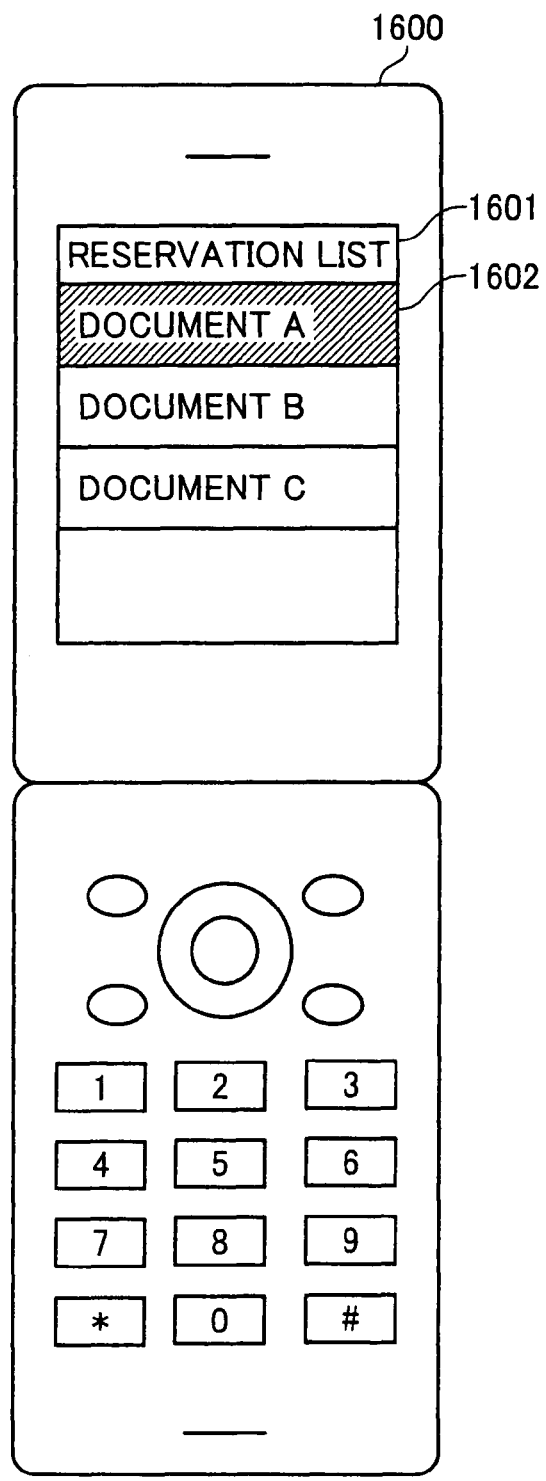
FIG. 16 is a schematic of a cellular phone for explaining an example when the cellular phone is used for authentication.

FIG. 16 is a schematic for explaining an example in which the cellular phone receives and displays reservation-reception information. For example, names of files, printing of which is reserved, are transmitted to a cellular phone 1600 from the PC 10. The cellular phone 1600 receives and displays the names of the files. When a user desires to print, for example, only a document A 1602 in a reservation list 1601 received, the user selects the document A 1602 from inputting means and inputs setting for printing.

When the setting input is transmitted to the printer with the Bluetooth function, because the printer has already received, as authentication information, a cellular phone number transmitted from the position management server 20 as reservation information, the printer compares the setting with the authentication information using the authentication function of the printer.

When the printer does not have the Bluetooth function, it is possible to transmit email to the printer through a cellular phone network or the Internet and perform authentication using an email address as authentication information.

It is possible to reduce complexity of manual input of authentication information by using the identification information such as the telephone number and the email address assigned to the cellular phone. Such identification information is unique to the cellular phone, and therefore, an authentication system with high certainty and convenience is realized.

Email attached with a file is transmitted from the cellular phone to the printer management server via a cellular phone network or the Internet. Thus, it is possible to obtain a print with a high image quality in the printer from the cellular phone, a simple information terminal with high convenience.

A printing system according to a fifth embodiment of the present invention is different from the printing system according to the first embodiment in that the display control unit 13 changes a scale and a display position of a layout on the monitor 11 based on position information of users and position information of printers received. Consequently, screen display is easier to see for the user.

Figure 17B:
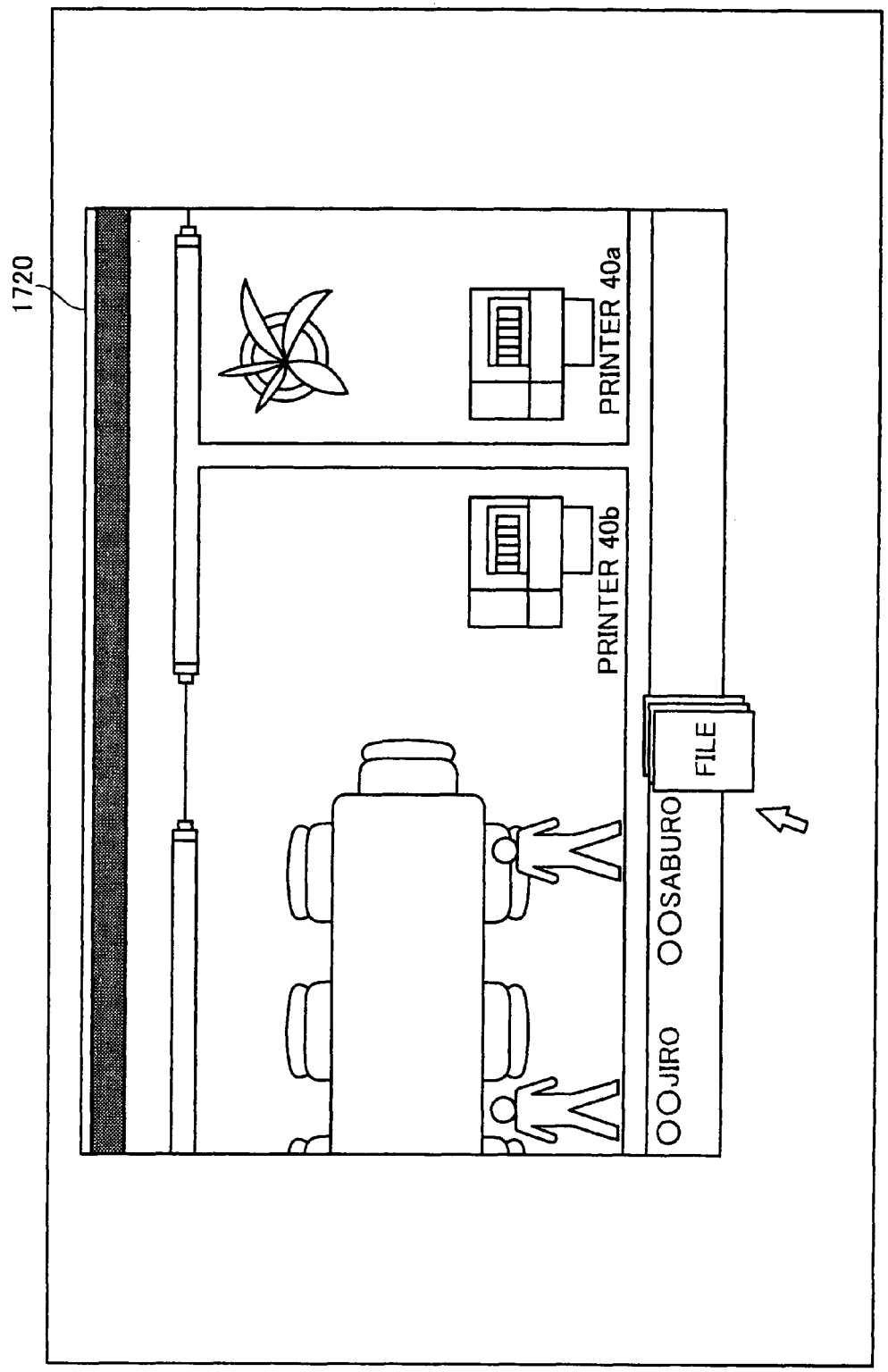

FIGS. 17A and 17B collectively show a schematic for explaining a layout displayed on a monitor by the printing system according to the fifth embodiment. In a layout 1710, an arrangement received first is displayed. A layout 1720 is displayed in enlargement with a reduced scale.

The display control unit 13 calculates distances among users and printers on the screen based on the position information of the users and the position information of the printers received. When the distances calculated are equal to or smaller than a predetermined distance on the screen, the display control unit 13 enlarges the image of the layout 1710 and displays the image as the layout 1720 on the monitor 11. Consequently, screen display easier to see for the user is obtained.

On the other hand, when the distances calculated are equal to or larger than the predetermined distance on the screen, the display control unit 13 reduces an image to be displayed and displays the image on the monitor 11. Consequently, screen display with which the user can overlook the entire image is obtained. For example, when the layout 1720 is displayed partially, the display control unit 13 displays the layout in reduction with an increased scale.

When midpoint coordinates of the position information of the users and the position information of the printers are distant from the center of the monitor 11 by a predetermined distance or more, the display control unit 13 moves the midpoint coordinates to be close to the center of the screen. Consequently, an object that the user desires to see is arranged near the center and screen display easier to see for the user is obtained.

Moreover, when printers displayed on the monitor 11 are too close to one another and displayed as if the printers overlap, the display control unit 13 compares pieces of position information of the printers. When it is judged that distances among the printers are equal to or smaller than a predetermined value, the display control unit 13 sets position information to display positions of printer icons apart from one another. This makes it possible to display the icons apart from one another to prevent overlap.

In this way, in the printing system according to the fifth embodiment, when an arrangement including users and printers are hard to see on the monitor of the PC, it is possible to change a display form to a display form easier to see for the user.

In the explanations of the examples in the first to the fifth embodiments, the present invention is applied to the PC 10 as an output requesting apparatus. However, the output requesting apparatus is not limited to the PC 10. It is possible to apply the present invention to any apparatus as long as the apparatus performs a predetermined output request. For example, the present invention may be applied to a multifunction product having at least one of a printer function, a scanner function, a copy function, and a facsimile function as the output requesting apparatus.

In the explanations of the examples in the first to the fifth embodiments, the PC 10 includes the printer management server that manages a printer. However, without the printer management server, the PC 10 may directly transmit a print request to the printer 40. In this case, the printer 40 only has to include the functions of the printer management server 30 (e.g., the functions of the print-data generating unit and the timing unit).

In the examples explained in the first to the fifth embodiments, a file is output as a print of a paper medium. However, the print is not limited to the paper medium as long as the print is an output medium. For example, it is also possible to apply the present invention when the file is output on, for example, an electronic paper. The electronic paper is a display that has thickness of about several tenth millimeter and on which display and erasure of data are possible by electric means. The electronic paper is a reflective display medium that is expected to realize, in addition to "visibility and carriability" of a hard copy printed on the paper medium, "combinability with and rewritability as digital information" and saving of paper resources of a soft copy displayed on a display screen. The electronic paper has characteristics of extreme thinness and flexibility that the conventional image display apparatus does not have.

Moreover, it is possible to apply the present invention to any apparatus as an output apparatus as long as the apparatus is movable and performs predetermined output processing. For example, the present invention can be applied to a cellular phone, a household electric appliance, and a vending machine as output apparatuses.

In this case, positions of the cellular phone, the household electronic appliance, and the vending machine, and the like on a map only have to be displayed in the PC 10 to request the respective apparatuses to perform output. When the arrangement of the cellular phone, the household electronic appliance, the vending machine, and the like is changed, positions of the respective apparatuses displayed in the PC 10 only have to be displayed on the map as positions after movement. In this case, there is an advantage that it is possible to execute appropriate output processing while always accurately grasping the layout of the apparatuses.

Figure 18:
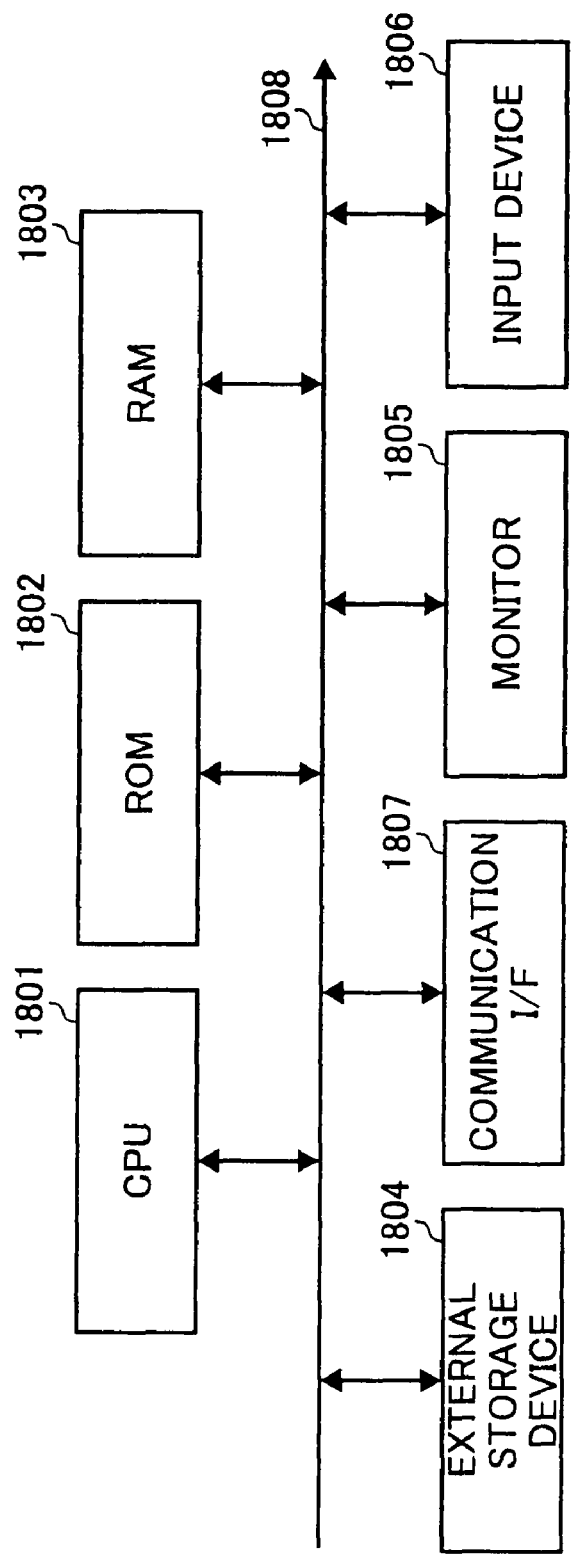
FIG. 18 is a diagram of a hardware configuration of devices of the printing systems according to the first to fifth embodiments.

FIG. 18 is a diagram of a hardware configuration of devices of the printing systems according to the first to fifth embodiments. The respective devices of the printing system according to the first to the fifth embodiments include a control device such as a central processing unit (CPU) 1801, storage devices such as a read only memory (ROM) 1802 and a random access memory (RAM) 1803, an external storage device 1804 such as a hard disk drive (HDD) or a compact disk (CD) drive device, an input device 1806 such as a keyboard or a mouse, a communication interface (I/F) 1807, which are connected by a bus 1808. The respective apparatuses have a hardware structure that uses a usual computer.

A computer program (hereinafter, "printing program") executed on the respective apparatuses according to the first to the third embodiments is stored in a computer-readable recording medium such as a compact disk-read only memory (CD-ROM), a flexible disk (FD), a compact disk-recordable, or a digital versatile disk (DVD) in an installable format or an executable format and provided.

The printing program can be stored in a computer connected to a network such as the Internet and downloaded through the network. The printing program can be provided or distributed through a network such as the Internet. The printing program can also be stored in a ROM or the like in advance.

The printing program includes modules that implement the units described above (the display control unit, the input receiving unit, the retrieving unit, the data accumulating unit, the notification-destination setting unit, the transmitting/receiving unit, the position-information generating unit, the printer-information acquiring unit, the driver selecting unit, the print-data generating unit, the output unit, the notification generating unit, etc.). As actual hardware, when a CPU (a processor) loads the printing program from the storage medium into a main storage device and executes the printing program, the display control unit, the input receiving unit, the retrieving unit, the data accumulating unit, the notification-destination setting unit, the transmitting/receiving unit, the position-information generating unit, the printer-information acquiring unit, the driver selecting unit, the print-data generating unit, the output unit, the notification generating unit, and the like are implemented on the main storage device.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An output requesting apparatus that is connected via a network to an output apparatus and a position-management server that manages user-position information indicating a detected position of a user and apparatus-position information indicating a detected position of the output apparatus, the output requesting apparatus comprising:
   a storage unit that stores therein data;
   a receiving unit that receives, from the position-management server, the user-position information, the apparatus-position information, and a map image that indicates an area where the output apparatus is installable;
   a display control unit that arranges on said map image a user symbol corresponding to the user and indicating the detected position of the user, an output device symbol corresponding to the output apparatus and indicating the detected position of the output apparatus, and a data symbol indicating the data in the map image, based on the user-position information and the apparatus-position information, and displays the map image on a display unit,
   wherein the display control unit causes the user symbol and the output device symbol to be displayed on the map image on said display unit, so that the relative positions of the user and the output apparatus become clear to a viewer;
   an input unit that receives selection input to select the user symbol, the output device symbol, and the data symbol in the map image;
   a transmitting unit that transmits, to the output apparatus corresponding to the output device symbol, an output command to output the data corresponding to the data symbol, and notification-destination information including identification information of the user corresponding to the user symbol, based on said selection input; and
   a reserving unit configured to generate reservation information indicating a reservation of the output command, wherein the reservation information includes identification information of the output apparatus and time information indicating a time to execute the output command, and the transmitting unit transmits reservation information indicating a reservation of the output command to the output apparatus.

2. The output requesting apparatus according to claim 1, wherein the receiving unit receives notification on data output based on notification-destination information issued by another output requesting apparatus.

3. The output requesting apparatus according to claim 1, wherein the receiving unit receives from the output apparatus one or more of output-start notification, output-state notification and output-end notification.

4. The output requesting apparatus according to claim 2, wherein the receiving unit receives output-start notification from the other output requesting apparatus.

5. A computer program product used in a system in which an output requesting apparatus is connected via a network to an output apparatus and a position-management sever that manages user-position information indicating a detected position of a user of another output requesting apparatus and apparatus-position information indicating a detected position of the output apparatus, the computer program product comprising a non-transitory tangible medium having computer readable program codes embodied in the medium that, when executed, cause a computer to execute:
   receiving, from the position-management server, the user-position information, the apparatus-position information, and a map image that indicates an area where the output apparatus is installable;
   arranging on said map image a user symbol corresponding to the user and indicating the detected position of the user, an output device symbol corresponding to the output apparatus and indicating the detected position of the output apparatus, and a data symbol indicating data in the map image, based on the user-position information and the apparatus-position information;
   displaying the map image with the user symbol and the output device symbol being displayed on the map image, so that the relative positions of the user and the output apparatus become clear to a viewer;
   receiving selection input to select the user symbol, the output device symbol, and the data symbol in the map image;
   transmitting, to the output apparatus corresponding to the output device symbol, a command to output the data corresponding to the data symbol, and notification-destination reformation including identification information of the user corresponding to the user symbol, based on the selection input; and transmitting reservation information indicating a reservation of the command to the output apparatus.

6. The output requesting apparatus of claim 1,
   wherein the input unit receives notification-destination input information that identifies a destination user,
   the transmitting unit transmits the notification-destination input information to the position-management server, and
   the receiving unit receives, from the position-management server, user-position information indicating a detected position of said destination user, apparatus-position information indicating a detected position of a destination output apparatus proximate to the detected position of said destination user, and a destination map image that indicates a destination area including the detected position of said destination user and the detected position of said destination output apparatus.

* * * * *

UNITED STATES PATENT AND TRADEMARK OFFICE
CERTIFICATE OF CORRECTION

| | | |
|---|---|---|
| PATENT NO. | : 7,792,927 B2 | Page 1 of 1 |
| APPLICATION NO. | : 11/708096 | |
| DATED | : September 7, 2010 | |
| INVENTOR(S) | : Umehara et al. | |

It is certified that error appears in the above-identified patent and that said Letters Patent is hereby corrected as shown below:

Replace the Title on the cover page of the patent, with the following:

Item -- (54) OUTPUT REQUESTING APPARATUS VIA A NETWORK FOR USER-POSITION INFORMATION AND APPARATUS-POSITION INFORMATION --.

Replace the Title at column 1, lines 1-3, of the patent, with the following:

-- OUTPUT REQUESTING APPARATUS VIA A NETWORK FOR USER-POSITION INFORMATION AND APPARATUS-POSITION INFORMATION --.

Signed and Sealed this
Fifteenth Day of March, 2011

David J. Kappos
*Director of the United States Patent and Trademark Office*